US011633320B2

(12) United States Patent
Park et al.

(10) Patent No.: US 11,633,320 B2
(45) Date of Patent: Apr. 25, 2023

(54) METHOD OF CONTROLLING WALKING ASSISTANCE DEVICE AND ELECTRONIC DEVICE PERFORMING THE METHOD

(71) Applicant: Samsung Electronics Co., Ltd., Suwon-si (KR)

(72) Inventors: Youngjin Park, Seoul (KR); Jusuk Lee, Suwon-si (KR); Hyundo Choi, Yongin-si (KR); Seungyong Hyung, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 666 days.

(21) Appl. No.: 16/678,543

(22) Filed: Nov. 8, 2019

(65) Prior Publication Data
US 2020/0188215 A1   Jun. 18, 2020

(30) Foreign Application Priority Data

Dec. 13, 2018   (KR) .................. 10-2018-0160922

(51) Int. Cl.
*A61H 3/00* (2006.01)
*B25J 9/00* (2006.01)
(Continued)

(52) U.S. Cl.
CPC ............ *A61H 3/008* (2013.01); *B25J 9/0006* (2013.01); *B25J 9/1607* (2013.01); *B25J 13/088* (2013.01);
(Continued)

(58) Field of Classification Search
CPC .... A61H 3/00; A61H 3/008; A61H 2003/001; A61H 2003/002; A61H 2003/005; B25J 9/0006
See application file for complete search history.

(56) References Cited

U.S. PATENT DOCUMENTS 7,713,217 B2    5/2010  Ikeuchi et al.
8,353,854 B2 *  1/2013  Horst .................. A61H 1/0266
                                                              318/552
(Continued)

FOREIGN PATENT DOCUMENTS

JP          3870403 B2      1/2007
KR    20160063962 A         6/2016

OTHER PUBLICATIONS

Du-Xin, Liu et al. "gait Phase Recognition for Lower-Limb Exoskeleton with Only Joint Angular Sensors" Jun. 28, 2016. (Year: 2016).*

(Continued)

*Primary Examiner* — Bradley H Philips
*Assistant Examiner* — Savannah L Gabriel
(74) *Attorney, Agent, or Firm* — Harness, Dickey & Pierce, P.L.C.

(57) ABSTRACT

A method for controlling an ankle-type walking assistance device may include measuring an angle of a joint of the walking assistance apparatus, calculating an angular velocity and a linear velocity of a frame of the walking assistance device using an inertial measurement unit (IMU) attached to the frame, generating a dynamics model for the walking assistance device based on the angle of the joint, the angular velocity and the linear velocity of the frame, calculating a disturbance applied to the walking assistance device based on the dynamics model, and controlling the walking assistance device based on the calculated force, equivalent, or wrench.

18 Claims, 20 Drawing Sheets

(51) Int. Cl.
 *B25J 13/08* (2006.01)
 *B25J 9/16* (2006.01)
 *G06F 17/16* (2006.01)
(52) U.S. Cl.
 CPC ........ *G06F 17/16* (2013.01); *A61H 2003/007* (2013.01); *A61H 2201/164* (2013.01); *A61H 2201/165* (2013.01); *A61H 2201/5079* (2013.01); *A61H 2203/0406* (2013.01); *A61H 2205/106* (2013.01); *A61H 2205/12* (2013.01)

(56) References Cited

U.S. PATENT DOCUMENTS

| | | | |
|---|---|---|---|
| 9,980,842 B2 * | 5/2018 | Nagasaka | A61F 5/01 |
| 2004/0167641 A1 | 8/2004 | Kawai et al. | |
| 2011/0112447 A1 * | 5/2011 | Hsiao-Wecksler | A61H 3/008 |
| | | | 601/33 |
| 2015/0142130 A1 * | 5/2015 | Goldfarb | A61H 1/0244 |
| | | | 623/25 |
| 2015/0201868 A1 | 7/2015 | Ronchi et al. | |
| 2015/0366738 A1 * | 12/2015 | Endo | G05B 15/02 |
| | | | 482/4 |
| 2016/0074180 A1 * | 3/2016 | Lenzi | A61F 2/6607 |
| | | | 623/24 |
| 2017/0128235 A1 * | 5/2017 | Seo | A61F 2/605 |
| 2018/0078442 A1 * | 3/2018 | Zoss | A61H 3/008 |
| 2019/0209413 A1 | 7/2019 | Lee et al. | |

OTHER PUBLICATIONS

Y. J. Park and W. K. Chung, 'External Torque Sensing Algorithm for Flexible-Joint Robot based on Disturbance Observer Structure,' *IEEE/RSJ International Conference in Intelligent Robots and Systems*, Sep. 2014, pp. 4735-4741.

J. Han et al., 'Robust coordinated motion control of an underwater vehicle-manipulator system with minimizing restoring moments,' *Ocean Engineering*, vol. 38, 2011, pp. 1197-1206.

Jonghoon Park, Principle of Dynamical Balance for Multibody Systems, Multibody System Dynamics (2005) 14: 269-299.

* cited by examiner

METHOD OF CONTROLLING WALKING ASSISTANCE DEVICE AND ELECTRONIC DEVICE PERFORMING THE METHOD

CROSS-REFERENCE TO RELATED APPLICATION

This application claims priority under 35 U.S.C. § 119 to Korean Patent Application No. 10-2018-0160922, filed on Dec. 13, 2018, in the Korean Intellectual Property Office, the entire contents of which are incorporated herein by reference in their entirety.

BACKGROUND

1. Field

At least one example embodiment relates to technology for controlling a walking assistance device. For example, at least some example embodiments relate to technology for estimating a disturbance applied to a walking assistance device and controlling the walking assistance device based on the estimated disturbance.

2. Description of the Related Art

With the onset of aging societies, a growing number of people experience inconvenience and pain in walking due to reduced muscular strength or malfunctioning joint issues. Thus, interest in a walking assistance device that enables an elderly user or a patient with reduced muscular strength or joint problems to walk with less effort is growing. Also, walking assistance devices for enhancing muscular strength of a human body, for example, for military purposes are being developed.

SUMMARY

Some example embodiments relate to a method of controlling a walking assistance device including a first frame, a second frame, and a joint connecting the first frame and the second frame.

In some example embodiments, the method may include measuring an angle of the joint of the walking assistance device based on angle information received from an angle sensor associated with the joint; calculating an angular velocity and a linear velocity of the first frame based on inertial information received from an inertial measurement unit (IMU) associated with the first frame; updating a dynamics model to generate an updated dynamics model for the walking assistance device based on the angle, the angular velocity, and the linear velocity; determining a first force applied to the first frame and a second force applied to the second frame based on the updated dynamics model; and controlling the walking assistance device based on the first force and the second force.

In some example embodiments, the updating of the dynamics model includes calculating an inertia matrix in the dynamics model based on at least one of the angle, the angular velocity, and the linear velocity; calculating a Coriolis matrix in the dynamics model based on at least one of the angle, the angular velocity, and the linear velocity; and setting the inertia matrix and the Coriolis matrix in the dynamics model to generate the updated dynamics model.

In some example embodiments, the determining of the first force and the second force includes calculating a force equivalent and a torque equivalent applied to the walking assistance device based on the updated dynamics model; and calculating the first force and the second force based on the force equivalent and the torque equivalent.

In some example embodiments, the calculating of the force equivalent and the torque equivalent includes calculating the force equivalent and the torque equivalent by filtering the updated dynamics model using a low-pass filter.

In some example embodiments, the calculating of the first force and the second force includes calculating the first force and the second force using a torque acting on the joint, the force equivalent, and the torque equivalent.

In some example embodiments, the controlling of the walking assistance device includes determining a gait phase of a user wearing the walking assistance device based on the first force and the second force; and controlling the angle of the joint based on the gait phase.

In some example embodiments, the controlling the angle of the joint includes controlling the joint to dampen the walking assistance device when the gait phase is a heel strike.

In some example embodiments, the controlling the angle of the joint includes controlling the joint such that a gait acceleration occurs when the gait phase is a push-off.

In some example embodiments, the controlling of the walking assistance device includes determining a level of gait balance of a user wearing the walking assistance device based on the first force and the second force; and controlling the walking assistance device based on the level of gait balance.

In some example embodiments, the controlling of the walking assistance device includes determining a level of gait balance of a user of the walking assistance device based on the first force and the second force; and transmitting the level of gait balance to an additional walking assistance device, wherein a gait balance of the user is controlled by the additional walking assistance device.

In some example embodiments, the first frame is attached to a calf of a user and the joint of the walking assistance device is configured to control an ankle joint of the user.

Some example embodiments relate to a non-transitory computer-readable medium including computer readable instructions to cause a computer to perform the method of controlling the walking assistance device.

Some example embodiments relate to an electronic device configured to control a walking assistance device, the walking assistance device including a first frame, a second frame, and a joint connecting the first frame and the second frame.

In some example embodiments, the electronic device includes a memory configured to store a program associated with controlling the walking assistance device; and a processor configured to execute the program to, measure an angle of the joint of the walking assistance device based on angle information received from an angle sensor associated with the joint, calculate an angular velocity and a linear velocity of the first frame based on inertial information received from an inertial measurement unit (IMU) associated with the first frame, update a dynamics model for the walking assistance device to generate an updated dynamics model based on the angle, the angular velocity, and the linear velocity, determine a first force applied to the first frame and a second force applied to the second frame based on the updated dynamics model, and control the walking assistance device based on the first force and the second force.

In some example embodiments, the processor is configured to update the dynamics model by, calculating an inertia matrix in the dynamics model based on at least one of the angle, the angular velocity, and the linear velocity; calculating a Coriolis matrix in the dynamics model based on at least one of the angle, the angular velocity, and the linear velocity; and setting the inertia matrix and the Coriolis matrix in the dynamics model to generate the updated dynamics model.

In some example embodiments, the processor is configured to determine the first force and the second force by, calculating a force equivalent and a torque equivalent applied to the walking assistance device based on the updated dynamics model; and calculating the first force and the second force based on the force equivalent and the torque equivalent.

In some example embodiments, the processor is configured to calculate the force equivalent and the torque equivalent by, converting the updated dynamics model into a disturbance observer (DOB) model; and calculating the force equivalent and the torque equivalent based on the DOB model.

In some example embodiments, the processor is configured to control the walking assistance device by, determining a gait phase of a user wearing the walking assistance device based on the first force and the second force; and controlling the angle of the joint of the walking assistance device based on the gait phase.

Some example embodiments relate to a method of controlling a walking assistance device, the walking assistance device including a first frame, a second frame, and a joint connecting the first frame and the second frame.

In some example embodiments, the method includes measuring an angle of the joint of the walking assistance device based on angle information received from an angle sensor associated with the joint; calculating an angular velocity and a linear velocity of the first frame based on inertial information acquired from an inertial measurement unit (IMU) associated with the first frame; updating a dynamics model for the walking assistance device to generate an updated dynamics model based on the angle, the angular velocity, and the linear velocity; determining a force equivalent applied to the walking assistance device based on the updated dynamics model; determining a gait phase based on the force equivalent; and controlling the walking assistance device based on the gait phase.

In some example embodiments, the determining of the gait phase includes detecting a characteristic of the force equivalent; and determining the gait phase based on the characteristic.

In some example embodiments, the controlling of the walking assistance device includes determining an output torque corresponding to the gait phase; and controlling the walking assistance device such that the output torque is output by the walking assistance device.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
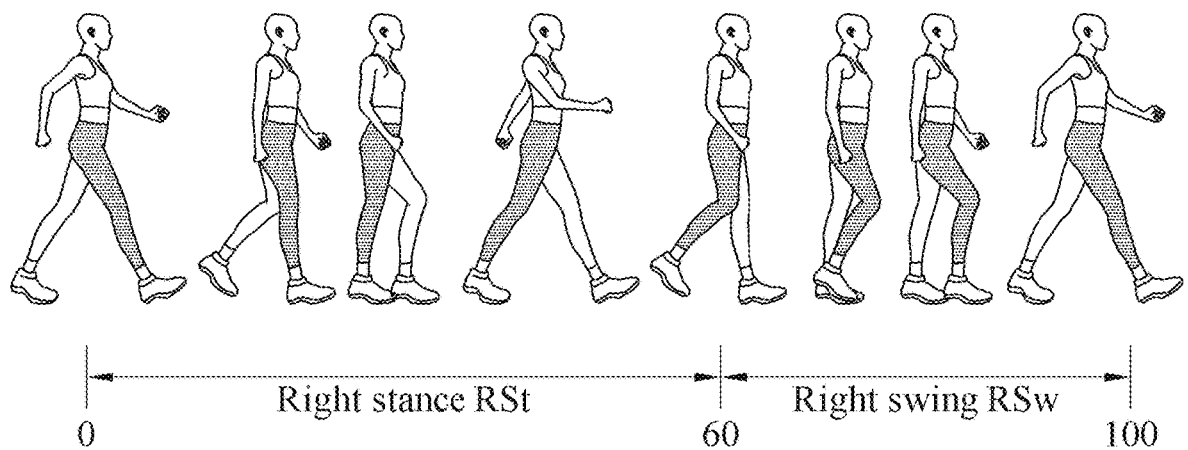
FIG. 1 illustrates a gait phase according to at least one example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

It should be understood, however, that there is no intent to limit this disclosure to the particular example embodiments disclosed. On the contrary, example embodiments are to cover all modifications, equivalents, and alternatives falling within the scope of the example embodiments. Like numbers refer to like elements throughout the description of the figures.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Various example embodiments will now be described more fully with reference to the accompanying drawings in which some example embodiments are shown. In the drawings, the thicknesses of layers and regions are exaggerated for clarity.

FIG. 1 illustrates a gait phase according to at least one example embodiment.

Referring to FIG. 1, gait phases of one leg of a user for a gait may be defined (or, alternatively, predefined). For example, the gait phases may include a stance and a swing. Gait phases of a left leg may be classified into a left stance LSt and a left swing LSw. Gait phases of a right leg may be classified into a right stance RSt and a right swing RSw. The term "gait phase" may be interchangeably used with the term "gait state".

A gait cycle associated with gait phases may be mapped to a finite state machine (FSM). For example, a gait cycle of 0% to 60% may be mapped from a point in time at which the stance starts to a point in time at which the stance ends. Also, a gait cycle of 60% to 100% may be mapped from a point in time at which the swing starts to a point in time at which the swing ends.

In one example, the stance and the swing may be sub-divided into a plurality of phases. For example, the stance may be sub-divided into an initial contact, a weight bearing, a middle stance, a terminal stance, and a pre-swing. The swing may be sub-divided into an initial swing, a middle swing, and a terminal swing. However, example embodiments are not limited to the example, and the stance and the swing may be sub-divided in various ways.

In another example, the stance may be sub-divided into a heel strike, a landing response, a mid-stance, a terminal stance, and a pre-swing. Also, the swing may be sub-divided into an initial swing, a mid-swing, and a terminal swing. However, example embodiments are not limited to the example, and the stance and the swing may be sub-divided in various ways.

Figure 2:
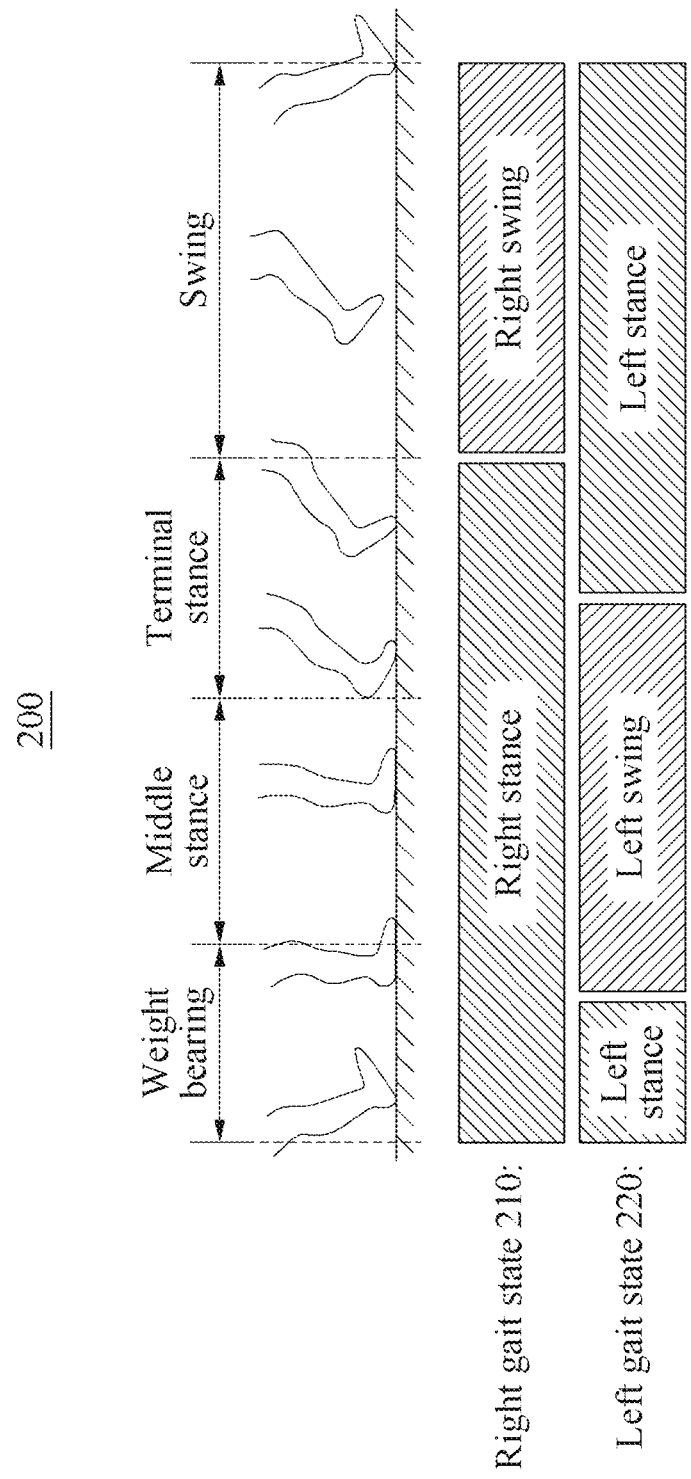
FIG. 2 illustrates a transition between gait phases according to at least one example embodiment.

FIG. 2 illustrates a transition between gait phases according to at least one example embodiment.

According to a general gait mechanism, gait phases of each leg include a stance and a swing, and the stance and the swing are alternately performed for walking.

A right gait state 210 associated with a walking pattern 200 of a right leg includes a right stance and a right swing.

The stance may include a weight bearing, a middle stance, and a terminal stance, however, is not limited thereto. A left gait state 220 associated with a change of a left leg (not shown) relative to the walking pattern 200 of the right leg includes a left stance and a left swing.

A normal transition between gait states may differ based on a gait state at a point in time at which a gait starts. The gait states may be transited in order of the right stance, the left swing, the left stance, and the right swing based on occurrence order of an event indicating a start of each gait state. The right stance may be performed again after the right swing.

During the gait phases, an angle of an ankle may be adjusted in response to the progress of a gait phase or a change of the gait phase. For example, during the swing state, the toe end of a foot of the user may be lifted to swing a leg to avoid the leg from being caught by a floor.

If muscular strength of an ankle of a user is reduced due to aging or diseases of the user, the user may experience discomfort with walking. For example, the user may have difficulty lifting the toe end of their foot.

Therefore, in one or more example embodiments, a walking assistance device worn around the ankle of the user may determine a gait phase of the user, and output an assist torque corresponding to the determined gait phase such that the ankle angle of the user may be adjusted based on the assist torque. As such, the walking assistance device may assist a user having difficulty in adjusting an angle of an ankle by himself or herself due to the reduced muscular strength of the ankle.

Hereinafter, a method of controlling a walking assistance device for providing an assist torque to an angle of a user according to one or more example embodiments will be described with reference to FIGS. 3 through 15.

Figure 3:
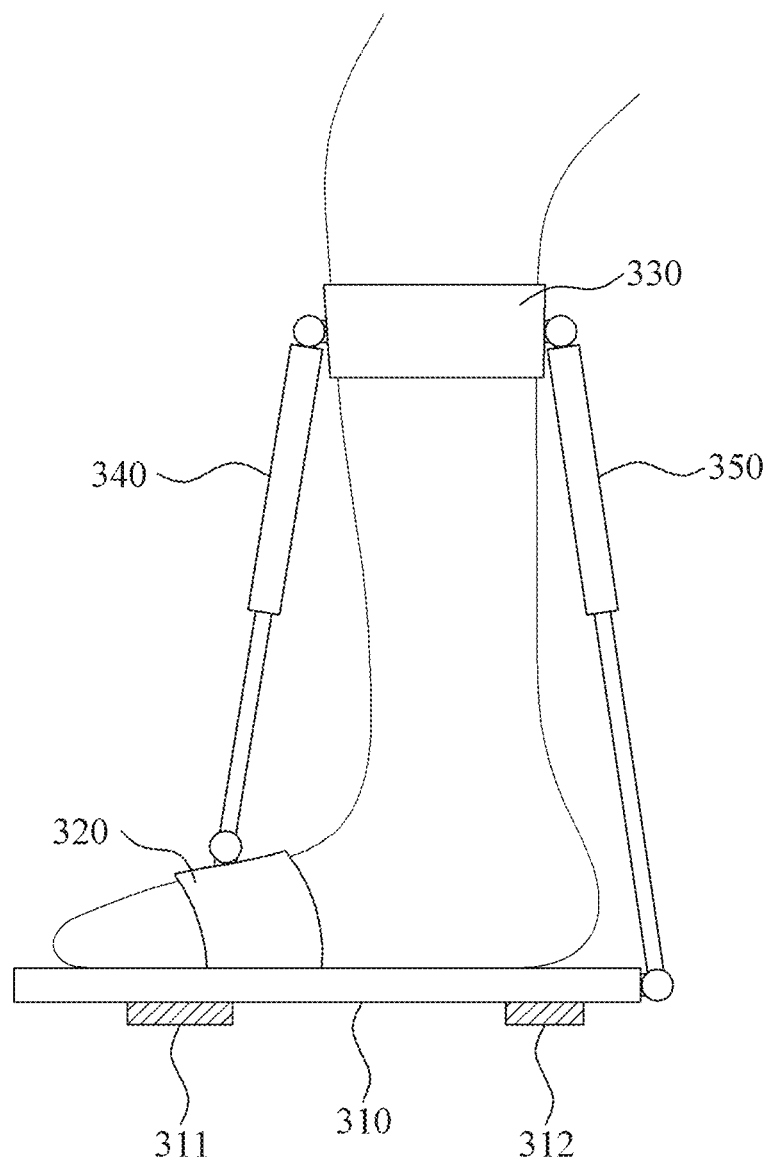
FIG. 3 illustrates a walking assistance device according to at least one example embodiment.

FIG. 3 illustrates a walking assistance device according to at least one example embodiment.

Referring to FIG. 3, a walking assistance device 300 may include a sole frame 310, a front pressure sensor 311, a rear pressure sensor 312, a lower end coupler 320, an upper end coupler 330, a first support frame 340, and a second support frame 350. The term "frame" may be interchangeably used with the term "body" or "body frame". Thus, "frame" may be understood as "body" or "body frame" in the following description.

For example, the front pressure sensor 311 may be provided to a front sole of a foot to measure pressure applied to a wide portion of the sole, and the rear pressure sensor 312 may be provided to a rear sole of the foot to measure pressure applied to a heel of the foot.

The first support frame 340 may connect the lower end coupler 320 and the upper end coupler 330. The lower end coupler 320 may be connected to the sole frame 310. The second support frame 350 may connect the sole frame 310 and the upper end coupler 330. The upper end coupler 330 may be worn around a calf or shin of the user.

A length of the first support frame 340 and a length of the second support frame 350 may be adjustable. For example, the length of the first support frame 340 and the length of the second support frame 340 may be adjusted by a driver (not shown). The driver may adjust the length of the first support frame 340 and the length of the second support frame 340 using a mechanical device.

When the length of the first support frame 340 decreases and the length of the second support frame 350 increases, the ankle of the user may be lifted. Conversely, when the length of the first support frame 340 increases and the length of the second support frame 350 decreases, the ankle of the user may be stretched.

Although FIG. 3 illustrates that the walking assistance device 300 includes the first support frame 340 and the second support frame 350, a number of support frames is not limited thereto. For example, the walking assistance device 300 may include a single first support frame 340, and may also include three or more support frames.

Figure 4:
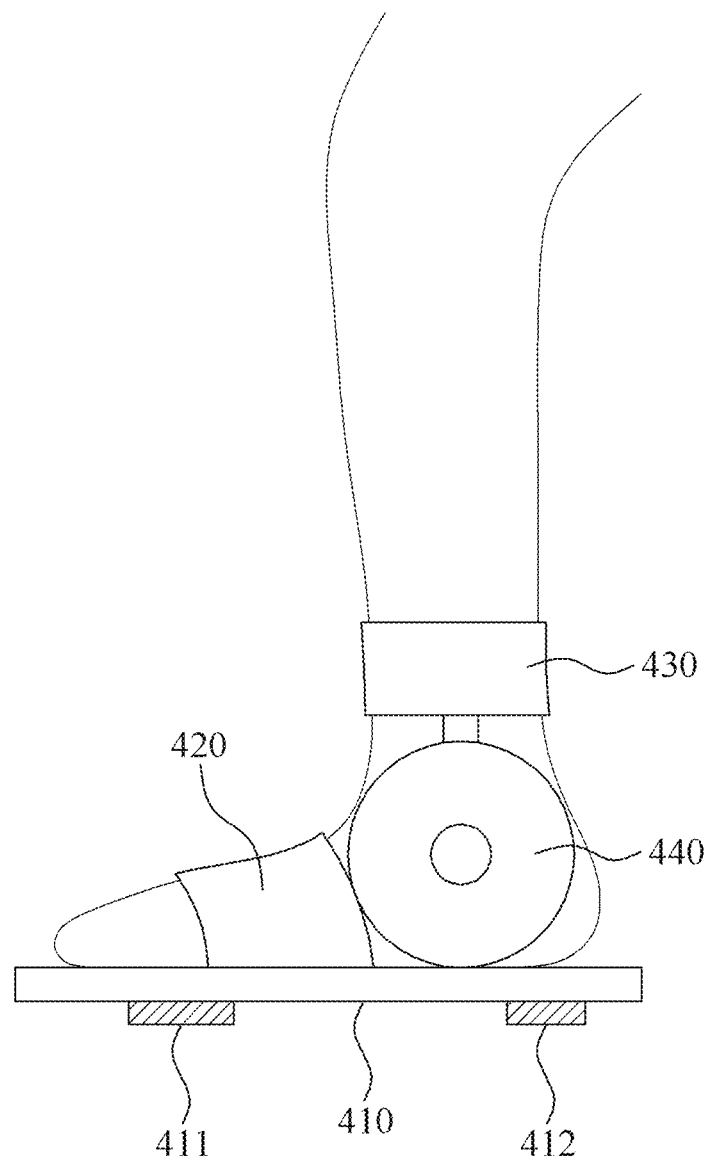
FIG. 4 illustrates a walking assistance device according to at least one example embodiment.

FIG. 4 illustrates a walking assistance device according to at least one example embodiment.

Referring to FIG. 4, a walking assistance device 400 may include a sole frame 410, a front pressure sensor 411, a rear pressure sensor 412, a lower end coupler 420, an upper end coupler 430, and a motor 440.

For example, the front pressure sensor 411 may be provided to a front sole of a foot to measure pressure applied to a wide portion of the sole, and the rear pressure sensor 412 may be provided to a rear sole of the foot to measure pressure applied to a heel of the foot.

The motor 440 may connect the lower end coupler 420 and the upper end coupler 430. A driver (not shown) may control the motor 440 to output a torque. When the motor 440 outputs the torque, an angle between the lower end coupler 420 and the upper end coupler 430 may be adjusted. When the angle between the lower end coupler 420 and the upper end coupler 430 decreases, an ankle of the user may be lifted. When the angle between the lower end coupler 420 and the upper end coupler 430 increases, the ankle of the user may be stretched.

Figure 5:
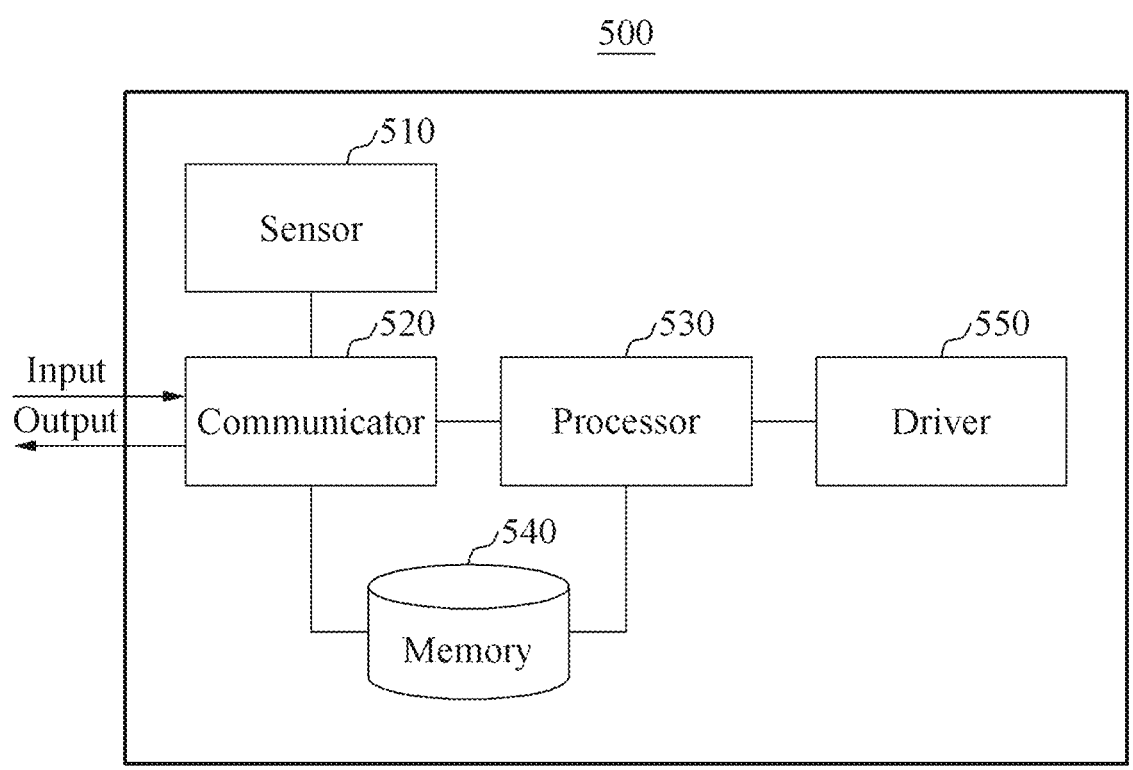
FIG. 5 is a block diagram illustrating an electronic device according to at least one example embodiment.

FIG. 5 is a block diagram illustrating an electronic device according to at least one example embodiment.

Referring to FIG. 5, an electronic device 500 may include at least one sensor 510, a communicator 520, a processor 530, a memory 540, and a driver 550. The electronic device 500 may be a device for controlling a walking assistance device. For example, the electronic device 500 may be included in the walking assistance device 300 of FIG. 3 and the walking assistance device 400 of FIG. 4. A type of the walking assistance device is not limited to an ankle-type, and the walking assistance device may also be provided as a hip-type or a body-type walking assistance device.

The at least one sensor 510 may include a pressure sensor, an inertial measurement unit (IMU), and/or an angle sensor. The pressure sensor may convert a magnitude of pressure applied to the pressure sensor to a voltage and output the voltage. The IMU may measure acceleration occurring due to a movement of the IMU. For example, the IMU may measure acceleration with respect to three axes. The angle sensor, for example, an encoder may measure an angle of at least one of an ankle, a knee, and a hip joint. When a first frame and a second frame of a walking assistance device are connected by a joint portion, the encoder may be located in the joint portion to measure an angle between the first frame and the second frame.

The communicator 520 may be connected to the sensor 510, the processor 530, and the memory 540 to transmit and receive data. The communicator 520 may be connected to an external device to transmit and receive data. Hereinafter, transmitting and receiving "A" may represent transmitting and receiving "information or data that indicates A".

The communicator 520 may be configured as a circuitry within the electronic device 500. For example, the communicator 520 may include an internal bus and an external bus. As another example, the communicator 520 may refer to an element that connects the electronic device 500 and the external device. The communicator 520 may be an interface.

The communicator 520 may receive data from the external device and transmit the data to the processor 530 and the memory 540.

The processor 530 may process data received by the communicator 520 and data stored in the memory 540. Here, the processor 530 may be a data processing device embodied by hardware including a circuitry having a physical structure to execute desired operations. The operations may include, for example, codes and instructions included in a program. The data processing device embodied by hardware may include, for example, a microprocessor, a central processing unit (CPU), a processor core, a multi-core processor, a multiprocessor, an application-specific integrated circuit (ASIC), and a field programmable gate array (FPGA). The processor 530 may execute a computer-readable code, for example, software, stored in the memory 540 that transform the processor 530 into a special purpose computer to assist walking of the user. For example, the computer-readable code, when executed, may configure the processor 530 as a special purpose processor to assist walking of the user by determining external forces applied by the user to the frames of the walking assistance device, determining a current gait phase of the user based on external forces; and controlling the walking assistance device based on the current gait phase. Therefore, the special purpose processor may improve the functioning of the walking assistance device itself by accurately controlling the walking assistance device without, for example, incurring the costs associated with acquiring ground reaction force (GRF) information.

The memory 540 may store data received by the communicator 520 and data processed by the processor 530. For example, the memory 540 may store the program. The stored program may be a set of syntaxes that are coded and executable by the processor 530 to assist walking of the user.

The memory 540 may include, for example, at least one volatile memory, nonvolatile memory, random memory access (RAM), flash memory, a hard disk drive, and an optical disk drive.

The memory 540 may store an instruction set, for example, software, for operating the electronic device 500. The instruction set for operating the electronic device 500 may be executed by the processor 530.

The driver 550 may include mechanical devices configured to adjust an angle of at least one of an ankle, a knee, and a hip joint of the user. For example, the driver 550 may include a motor, and a torque output from the motor may be used to adjust the angle of at least one of the ankle, the knee, and the hip joint. As another example, the driver 550 may include a force conversion device capable of adjusting a length of a support frame. The force conversion device may convert a rotary motion caused by the driver 550 to a linear motion.

The sensor 510, the communicator 520, the processor 530, the memory 540, and the memory 550 will be further described with reference to FIGS. 6 through 15.

Figure 6:
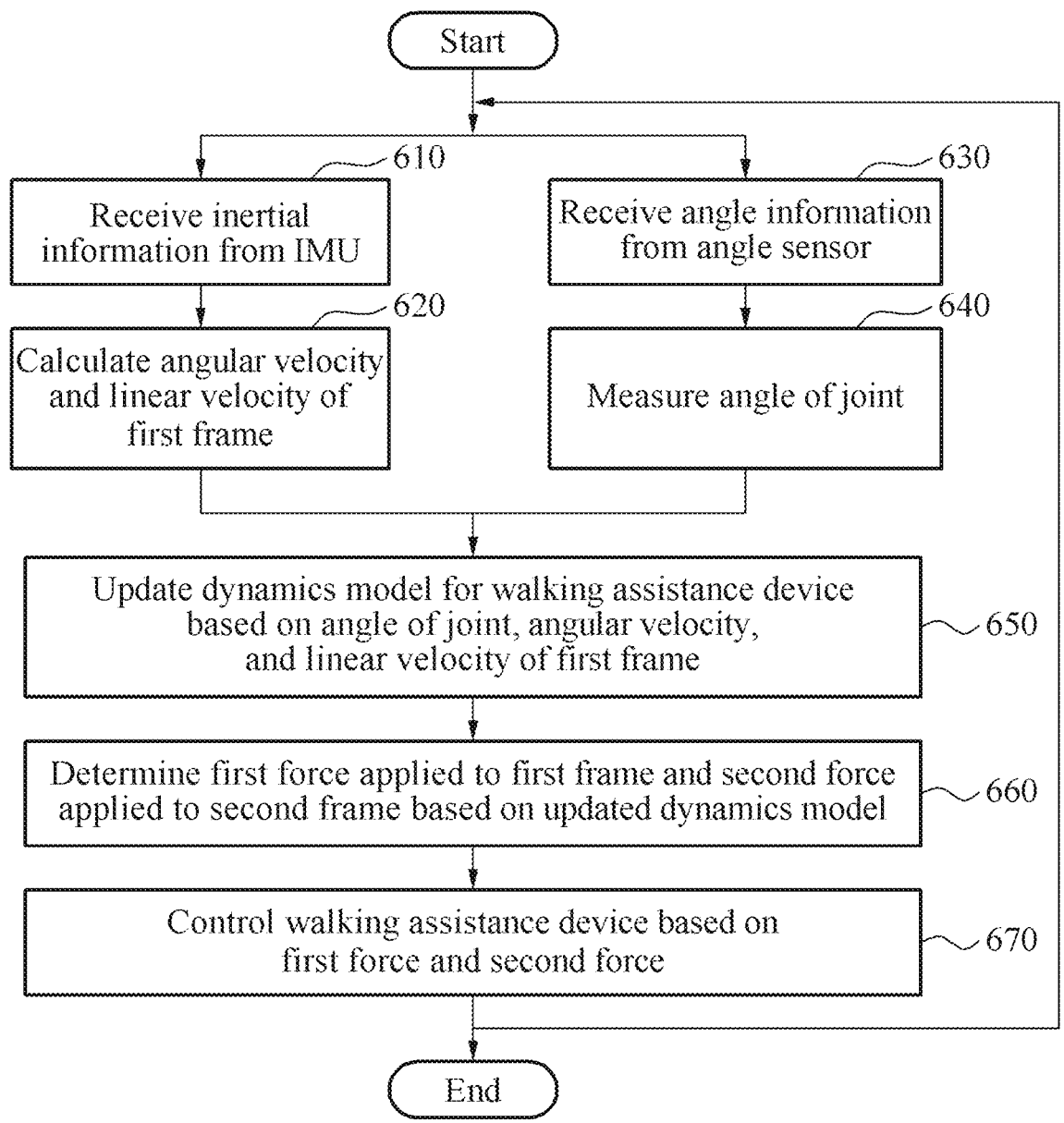
FIG. 6 is a flowchart illustrating a method of controlling a walking assistance device according to at least one example embodiment.
Figure 7:
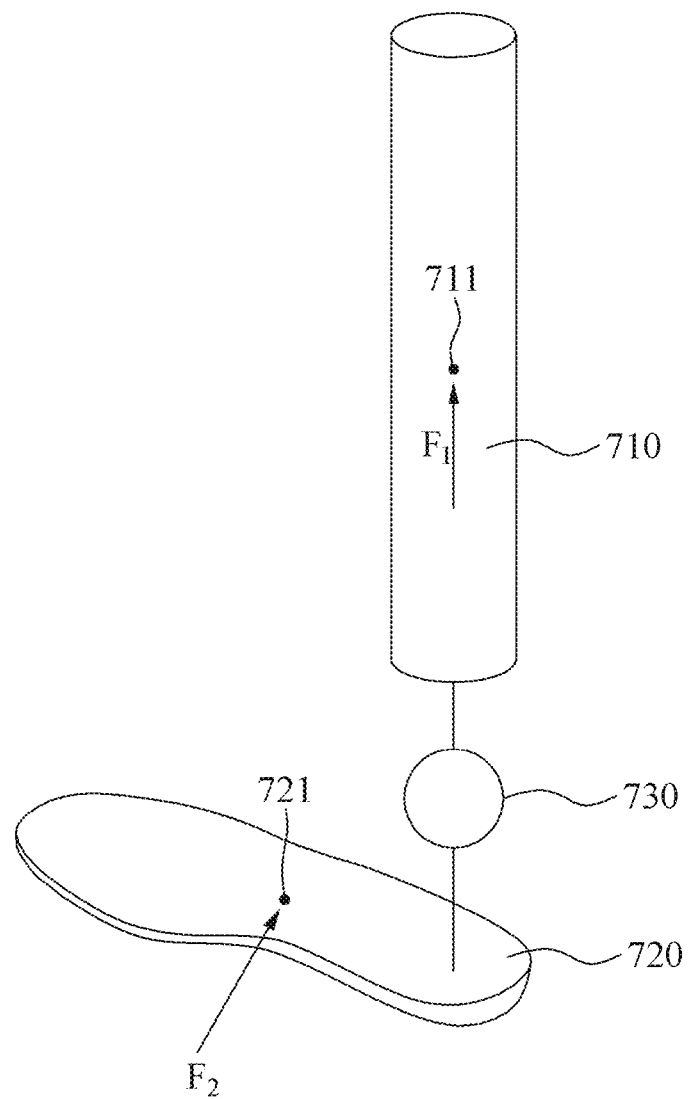
FIG. 7 illustrates a walking assistance device modeled based on dynamics according to at least one example embodiment.

FIG. 6 is a flowchart illustrating a method of controlling a walking assistance device according to at least one example embodiment and FIG. 7 illustrates a walking assistance device modeled based on dynamics according to at least one example embodiment.

Referring to FIGS. 6 and 7, when a walking assistance device is an ankle-type, a gait phase of a user may be estimated based on information on whether a sole contacts a ground and device movement information acquired using an IMU. Here, the information on whether the sole contacts the ground may be acquired using a force sensitive resistor (FSR) sensor. When kinetic information of walking is additionally used, a walking intention of the user may be predicted more clearly. Particularly, when ground reaction force (GRF) information is acquired in real time, a direction of force applied to the walking assistance device during the walking may be acquired, so that an accurate walking assistance function is provided. However, it is difficult to acquire the GRF information in real time due to restrictions on equipment, cost, and location.

A movement of the ankle-type walking assistance device in a space may be entirely due to walking of the user. Thus, a force applied to the walking assistance device, other than an assist torque provided by the walking assistance device to the ankle of the user, may be derived from the user. When a total amount of external force applied to the ankle-type walking assistance device is acquired, a force applied by the user to the walking assistance device may be obtained, so that a current gait phase of the user is determined based on the force applied to the walking assistance device.

A force applied to the walking assistance device may be calculated based on an ankle angle measured by an angle sensor, an angular velocity and a linear velocity of the walking assistance device measured by an IMU of the electronic device 500. Based on the calculated force, the walking assistance device may be controlled by, for example, determining the current gait phase of the user based on the calculated force and controlling the walking assistance device based on the current gait phase. The aforementioned method may be performed by the electronic device 500 and will be described in detail with reference to operations 610 through 670 below.

Referring to FIG. 7, before operation 610 is performed, a dynamics model for the walking assistance device may be generated in advance. For example, as illustrated in FIG. 7, an ankle-type walking assistance device may be modeled as a first frame 710, a second frame 720, and a rotary joint 730.

A first force $F_1$ applied to a mass center 711 of the first frame 710 and a second force $F_2$ applied to a mass center 721 of the second frame 720 may be external forces. A torque for operating the rotary joint 730 may be a force applied by the walking assistance device.

Although FIG. 7 illustrates the rotary joint 730 as an ankle joint, a rotary joint may also be a knee joint or a hip joint.

Even when the first frame 710, the second frame 720, and the rotary joint 730 are moving, parameters of an unchanged dynamics model may be calculated or set in advance. For example, masses of the first frame 710 and the second frame 720 may be set in advance.

When the first frame 710, the second frame 720, and the rotary joint 730 are moving, parameters of a changed dynamics model may be calculated based on an operating cycle of a system in real time so as to be updated. For example, a parameter (or an inertia matrix of the walking assistance device) such as a moment of inertia of the walking assistance device may be a variable value since a relationship between the first frame 710 and the second frame 720 varies based on a change of the rotary joint 730.

For example, when the walking assistance device is assumed as the two frames 710 and 720 connected by the rotary joint 730 to be floated in a space, a dynamics model of the walking assistance device may be defined by Equation 1.

$$W\begin{Bmatrix}F_1\\F_2\end{Bmatrix} + L\tau = \begin{Bmatrix}\sum F\\\sum \tau\end{Bmatrix} = \begin{Bmatrix}\begin{Bmatrix}\sum f\\\sum n\end{Bmatrix}\\\sum \tau\end{Bmatrix} \quad \text{[Equation 1]}$$

$$= \begin{Bmatrix}F_1 + Ad_1 F_2\\\tau + Ad_2 F_2\end{Bmatrix}$$

In Equation 1, WF denotes an influence of an external force applied to the walking assistance device and $L\tau$ denotes an influence of an external force acting on a joint of the walking assistance device.

Also, W denotes a wrench influence matrix, $F_1$ denotes a matrix for an external force body wrench acting on the first frame 710, and $F_2$ denotes a matrix for an external force body wrench acting on the second frame 720. A body wrench $\Sigma F$ which is all external force body wrenches acting on the walking assistance device may be referred to as a force equivalent. Because the force equivalent is a body wrench, a component of the force equivalent may simultaneously include an external force f and an external force torque (or a moment n). Since the notation for the force equivalent is based on the notation for the screw theory, the external force and the external force torque may be represented the same.

L denotes a torque influence matrix and $\tau$ denotes a torque acting on the rotary joint 730. A body wrench $\Sigma\tau$ which is all external force body wrenches acting on the rotary joint 730 may be referred to as a force equivalent. Since the walking assistance device is assumed as the two frames 710 and 720 connected by the rotary joint 730 to be floated in a space, the complex force may be represented based on the first frame 710 and the torque equivalent may be represented based on the rotary joint 730.

$Ad_1$ denotes an adjoint transformation matrix for representing a body wrench $F_2$ acting on the second frame 720 with respect to the first frame 710. $Ad_2$ denotes a joint transformation matrix for representing a torque generated in the rotary joint 730 due to the external force body wrench $F_2$ acting on the second frame 720. The adjoint transformation matrix and the joint transformation matrix may be derived without difficulty from the screw theory and documents that describes the screw theory.

Equation 1 may also be expressed by Equation 2 as shown below.

$$WF + L\tau = M_0\begin{bmatrix}\dot{V}\\\ddot{q}\end{bmatrix} + C_0\begin{bmatrix}V\\\dot{q}\end{bmatrix} \quad \text{[Equation 2]}$$

$$= \frac{d}{dt}\left(M_0\begin{bmatrix}\begin{Bmatrix}v\\w\end{Bmatrix}\\\dot{q}\end{bmatrix}\right) - C_0^T\begin{bmatrix}\begin{Bmatrix}v\\w\end{Bmatrix}\\\dot{q}\end{bmatrix}$$

In Equation 2, $M_0$ denotes an inertia matrix, V denotes a body twist expressed based on a body frame coordinate system, q denotes an angle of the rotary joint 730, and $C_0$ denotes a Coriolis matrix. The body twist V may include a linear velocity $\upsilon$ and an angular velocity $\omega$.

Additionally, before operation 610 is performed, calibration between sensors may be performed.

Referring back to FIG. 6, in operation 610, the electronic device 500 may generate inertial information of a walking assistance device using an IMU or may receive inertial information from the IMU. For example, when the IMU is attached to the first frame 710, the inertial information may be inertial information of the first frame 710.

In operation 620, the electronic device 500 may calculate an angular velocity and a linear velocity of the first frame 710 based on the inertial information. Further, the electronic device 500 may calculate a body twist V of the first frame 710 based on the angular velocity and the linear velocity. For example, the body twist V may be calculated by converting the angular velocity and the linear velocity of the first frame 710 into a coordinate system of the first frame 710.

In operation 630, the electronic device 500 may receive angle information from an angle sensor. The angle information may be periodically generated based on an operation cycle of the angle sensor.

In operation 640, the electronic device 500 may measure an angle q of the rotary joint 730.

In operation 650, the electronic device 500 may update a dynamics model for the walking assistance device based on the angle q of the joint, an angular velocity $\omega$, and a linear velocity $\upsilon$ of the first frame 710. For example, $M_0$ and $C_0$ of Equation 2 may be calculated based on the angle q of the joint, the angular velocity $\omega$ and the linear velocity $\upsilon$ of the first frame 710, so that the calculated value is set in Equation 2. A method of updating the dynamics model will be described in detail with reference to FIG. 8.

In operation 660, the electronic device 500 determines a first force applied to the first frame 710 and a second force applied to the second frame 720 based on the updated dynamics model.

For example, since the electronic device 500 calculates the linear velocity $\upsilon$ and the angular velocity $\omega$ of a first frame in operation 620, and measures the current angle q of a joint in operation 640, the electronic device may calculate WF and L$\tau$ based on Equation 2.

Figure 11:
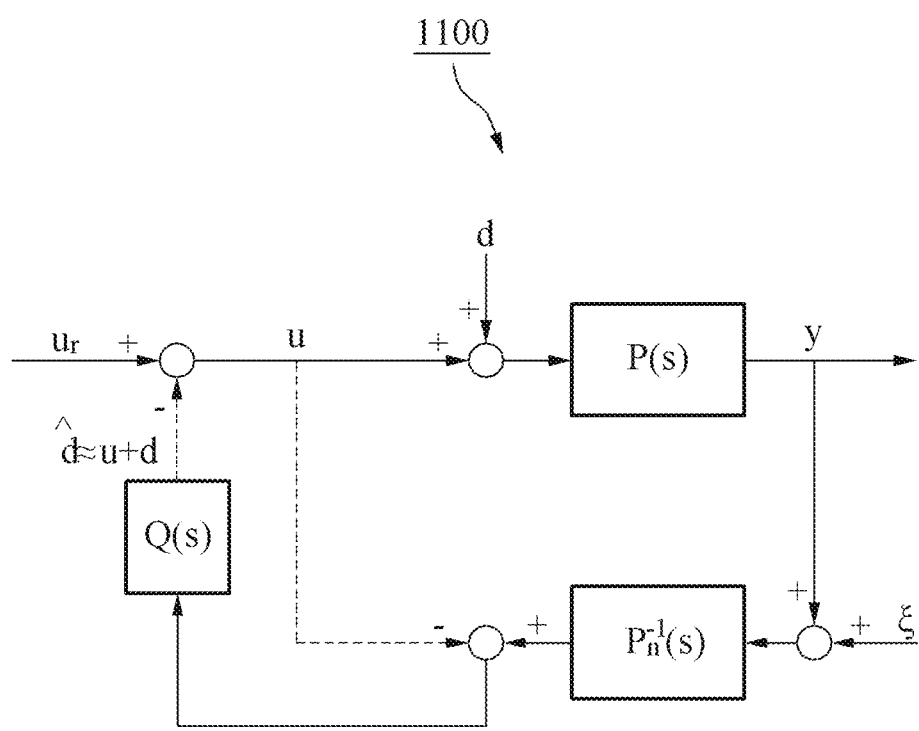
FIG. 11 illustrates a disturbance observer (DOB) according to at least one example embodiment.

According to an aspect, the force equivalent and the torque equivalent may be calculated using a disturbance observer (DOB). A first force applied to the first frame 710 and a second force applied to the second frame 720 by the force equivalent and the torque equivalent may be calculated. FIG. 11 illustrates an example of the DOB, however example embodiments are not limited thereto.

In operation 670, the electronic device 500 controls the walking assistance device based on the first force and the second force. For example, the electronic device 500 may determine a gait phase of the user based on the first force and the second force and provide a torque corresponding to the determined gait phase to at least one of the ankle, the knee, and the hip joint of the user. A method of controlling the walking assistance apparatus will be described in detail with reference to FIGS. 12 through 15.

Further, nerves of a user may become less sensitive as the user ages such that a threshold level of a minimum stimulus detectable by the user may increase, which may cause difficulty in, for example, walking when the user cannot feel pressure on the sole of their foot As such, in some example embodiments, in addition to controlling the walking assistance device based on the determined gait phase of the user, the walking assistance device may further include one or more vibrators (not shown), and the method executed by the electronic device 500 may further include generating a vibration signal having a varying frequency such that at least a portion of the vibration signal resonates along with an external stimulus, and controlling the vibrator based on the vibration signal to allow the user to detect when they should lift their leg to swing to avoid the leg from being caught by a floor.

Figure 8:
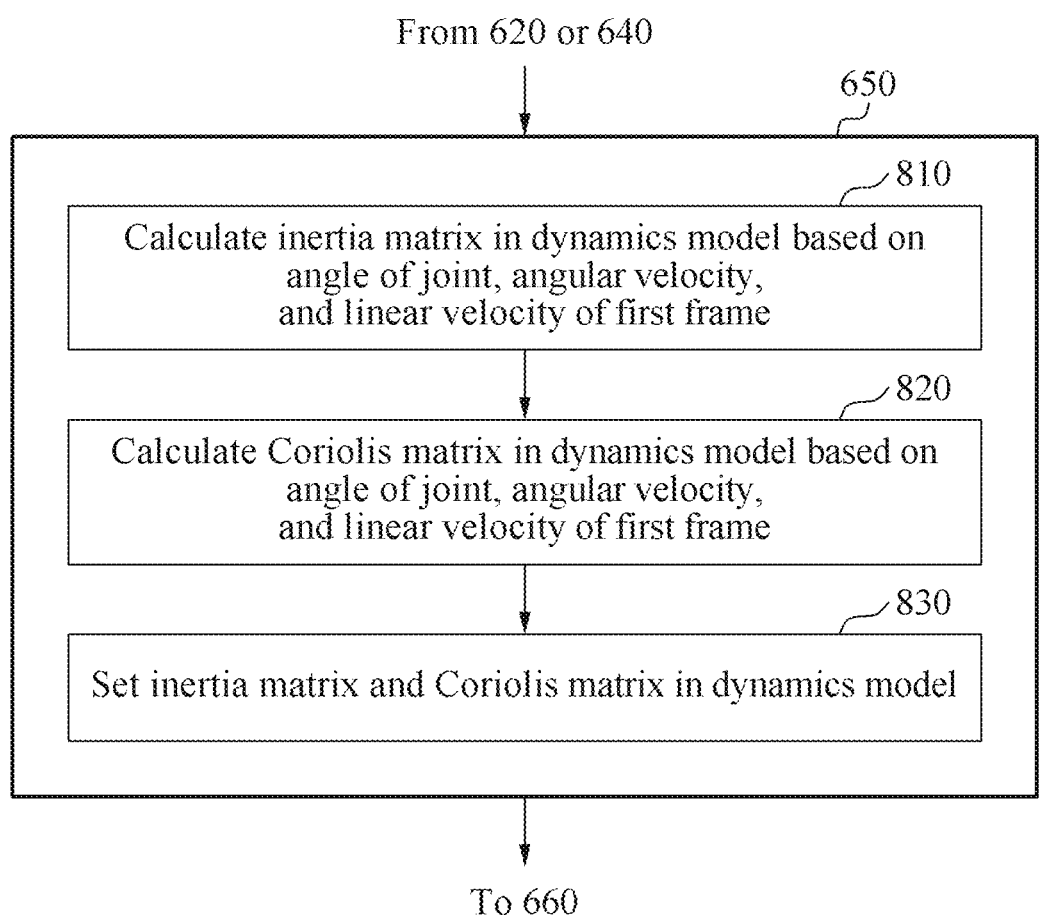
FIG. 8 is a flowchart illustrating a method of updating a dynamics model for a walking assistance device according to at least one example embodiment.

FIG. 8 is a flowchart illustrating a method of updating a dynamics model for a walking assistance device according to at least one example embodiment.

Referring to FIGS. 6 and 8, operation 650 of FIG. 6 may include operations 810 through 830.

In operation 810, the electronic device 500 calculates an inertia matrix $M_0$ in a dynamics model based on an angle q of the joint, an angular velocity $\omega$, and a linear velocity $\upsilon$ of the first frame 710.

For example, the electronic device 500 may determine a position relationship of the first frame 710, the second frame 720, and the rotary joint 730 in a space based on the angle q of the joint, the angular velocity $\omega$, and the linear velocity $\upsilon$ of the first frame 710, so that an inertia matrix $M_0$ of a walking assistance device is calculated based on the determined position relationship.

In operation 820, the electronic device 500 calculates a Coriolis matrix $C_0$ in the dynamics model based on the angle q of the joint, the angular velocity $\omega$, and the linear velocity v of the first frame 710.

Since the walking assistance device moves in a 3D space during operation, the walking assistance device may make a rigid rotational motion. The electronic device 500 may calculate the Coriolis matrix $C_0$ of such rotational motion.

In operation 830, the electronic device 500 sets the inertia matrix $M_0$ and the Coriolis matrix $C_0$ in the dynamics model. For example, the electronic device 500 may set values of parameters of the inertia matrix $M_0$ and the Coriolis matrix $C_0$ in Equation 2 to be calculated values.

Figure 9:
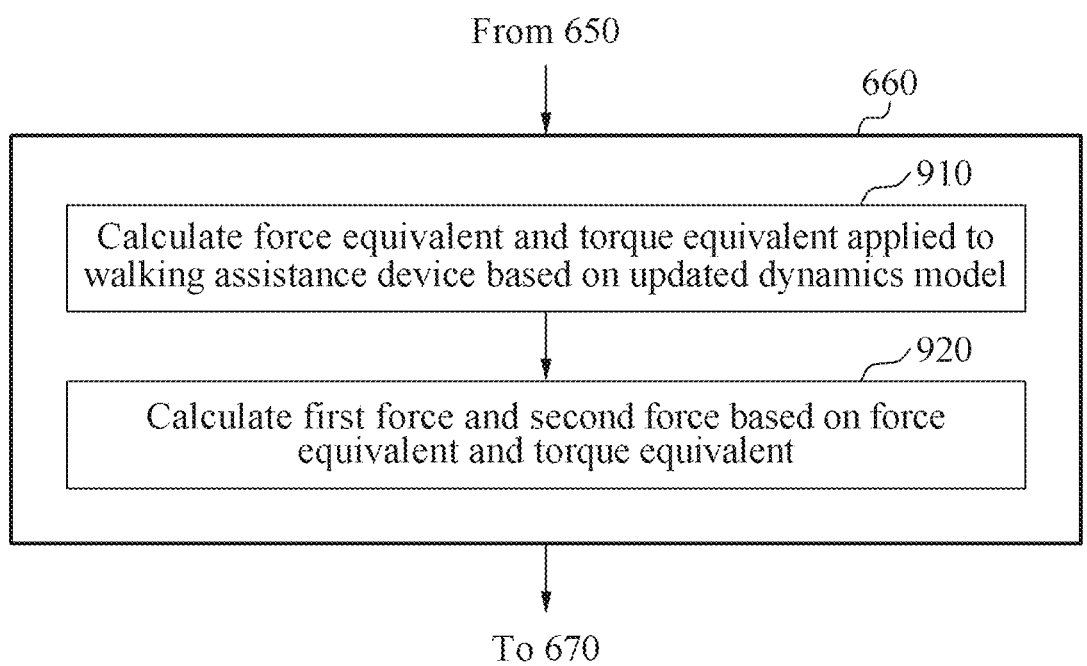
FIG. 9 is a flowchart illustrating a method of determining a first force applied to a first frame and a second force applied to a second frame in a walking assistance device according to at least one example embodiment.

FIG. 9 is a flowchart illustrating a method of determining a first force applied to a first frame and a second force applied to a second frame in a walking assistance device according to at least one example embodiment.

Referring to FIGS. 6 and 9, operation 660 of FIG. 6 includes operations 910 and 920.

In operation 910, the electronic device 500 calculates a force equivalent and a torque equivalent applied to a walking assistance device based on an updated dynamics model. For example, the electronic device 500 may calculate the force equivalent and the torque equivalent by calculating the right-hand side of Equation 1. A method of calculating the force equivalent and the torque equivalent will be described in detail with reference to FIGS. 10 and 11.

In operation 920, the electronic device 500 calculates a first force and a second force based on the force equivalent and the torque equivalent. For example, the electronic device 500 may calculate each of the first force and the second force based on the force equivalent, the torque equivalent, and a torque of a joint. The first force may be a wrench $F_1$ applied to the first frame 710. The second force may be a wrench $F_2$ applied to the second frame 720. Since a force equivalent $\Sigma F$ and a torque equivalent $\Sigma \tau$ are calculated according to Equation 1 and a wrench influence matrix W and a torque influence matrix L are known, the electronic device 500 may calculate a first force $F_1$ and a second force $F_2$. Each of the calculated first force and second force may include an intensity of force and a direction in which the force is applied.

Figure 10:
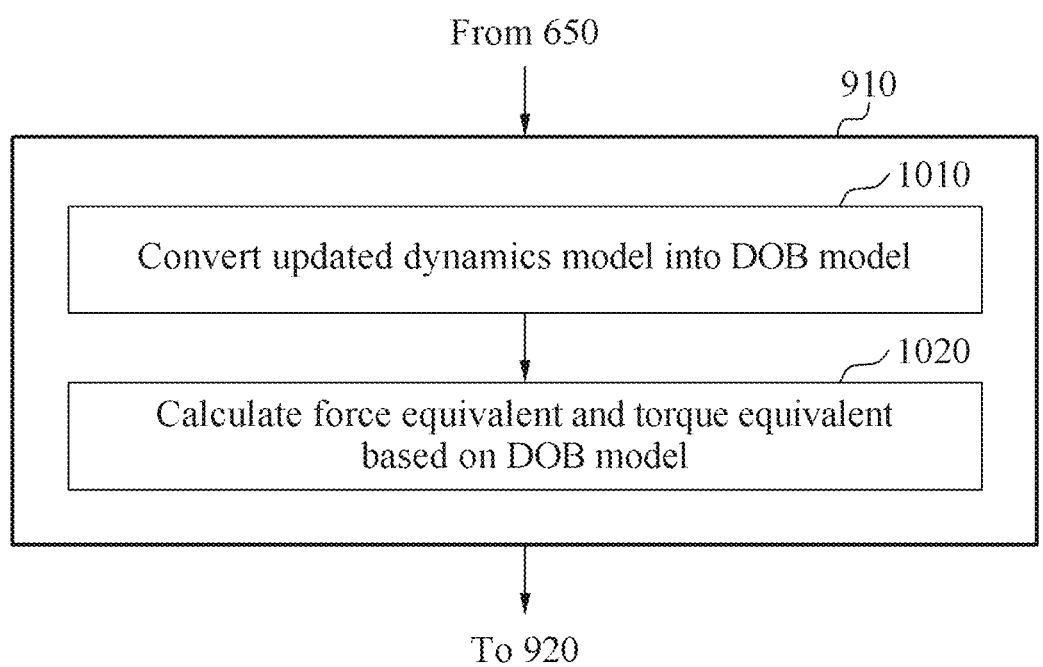
FIG. 10 is a flowchart illustrating a method of calculating a force equivalent and a torque equivalent applied to a walking assistance device according to at least one example embodiment.

FIG. 10 is a flowchart illustrating a method of calculating a force equivalent and a torque equivalent applied to a walking assistance device according to at least one example embodiment, and FIG. 11 illustrates a disturbance observer (DOB) according to at least one example embodiment.

When an updated dynamics model is filtered using a low-pass filter, a force equivalent and a torque equivalent may be calculated. For example, the low-pass filter may be a filter generated using a structure of a disturbance observer (DOB). Operations 1010 and 1020 relate to a method of calculating a force equivalent and a torque equivalent using the DOB.

Referring to FIGS. 9 to 11, operation 910 of FIG. 9 includes operations 1010 and 1020 below.

In operation 1010, the electronic device 500 converts an updated dynamics model into a DOB model.

For example, in FIG. 11, $u_r(s)$ denotes a reference control input, u(s) denotes a control input, d(s) denotes a disturbance, ξ(s) denotes a measurement noise, P(s) denotes a system plant, $P_n(s)$ denotes a nominal model of the system plant, and Q(s) denotes a Q-filter. For example, the Q-filter may be a first- or higher-degree low-pass filter. If ξ(s) has mainly high-frequency components (for example, ξ(s)≈0) and a modeling error can be neglected (for example, P(s) ≈$P_n$(s)), d̂(s) measured by the structure of the DOB may be a signal obtained by low-pass filtering d(s).

With respect to an input û input to the system plane P(s) in the DOB, Equation 3 may be established as shown below.

$$\hat{u}=u+d=Q(s)P_n^{-1}(s)(y+\xi) \quad \text{[Equation 3]}$$

By applying the low-pass filter to the nominal model of the system plane, the input û input to the system plane P(s) may be measured. When the input û of the DOB is applied to the disturbance (for example, the left-hand side of Equation 1) of a dynamics model of a walking assistance device and y+ξ of the DOB is applied to an output (for example, q, σ, and ω in Equation 2) of the dynamics model of the walking assistance device, Equation 5 may be established as shown below.

$$\left\{\begin{array}{c}\sum F \\ \sum \tau\end{array}\right\} = Q(s)\left(\frac{1}{P_n(s)}\left[\left\{\begin{array}{c}v(s) \\ w(s)\end{array}\right\} \\ \dot{q}(s)\end{array}\right]\right) = Q(s)T_{DYNA}(s) \quad \text{[Equation 5]}$$

$T_{DYNA}(s)$ may be a dynamics model of a system of the walking assistance device and expressed as shown in Equation 6 below.

$$T_{DYNA}(s) = \mathcal{L}\left[\frac{d}{dt}\left(M_0\left\{\begin{array}{c}v \\ w \\ \dot{q}\end{array}\right\}\right)\right] - \mathcal{L}\left[C_0^T\left\{\begin{array}{c}v \\ w \\ \dot{q}\end{array}\right\}\right] \quad \text{[Equation 6]}$$
$$= sT_{DYNA,I}(s) + T_{DYNA,II}(s)$$

When Equation 6 is Z-transformed, Equation 6 may be expressed to be Equation 7.

$$\left\{\begin{array}{c}\sum F \\ \sum \tau\end{array}\right\} = Z^{-1}[Q(s)T_{DYNA}(s)]_{s=\frac{2}{T}\frac{z-1}{z+1}} \quad \text{[Equation 7]}$$
$$= Z^{-1}[Q(s)(sT_{DYNA,I}(s)) + T_{DYNA,II}(s)]_{s=\frac{2}{T}\frac{z-1}{z+1}}$$
$$= Z^{-1}[sQ(s)]_{s=\frac{2}{T}\frac{z-1}{z+1}} * T_{DYNA,I}(k) + Z^{-1}[Q(s)]_{s=\frac{2}{T}\frac{z-1}{z+1}} * T_{DYNA,II}(k)$$

In operation 1020, the electronic device 500 calculates a force equivalent and a torque equivalent based on the DOB model.

In Equation 7, Q(s) may be a Q-filter of the DOB, and a structure thereof may be known to a filter designer. In this example, a force equivalent and a torque equivalent may be calculated by filtering, for example, digital-filtering the dynamics model $T_{DYNA}(s)$ updated based on a measured angle q of a joint, the linear velocity υ, and the angular velocity ω of the first frame 710 using the Q-filter and an sQ-filter.

Figure 12:
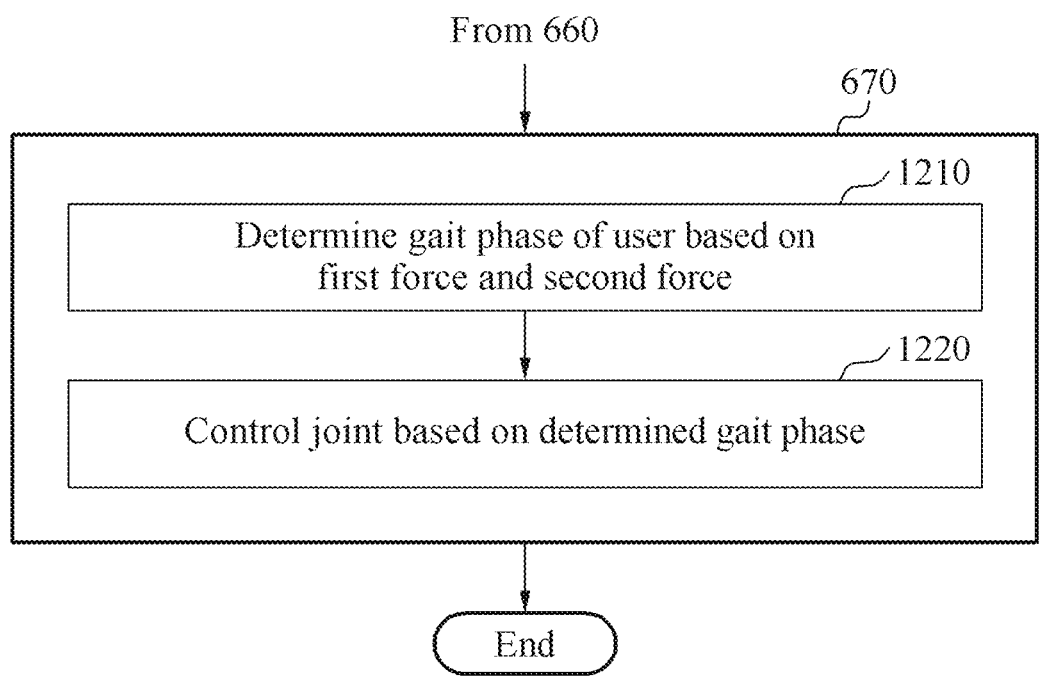
FIG. 12 is a flowchart illustrating a method of controlling a walking assistance device based on a first force and a second force according to at least one example embodiment.

FIG. 12 is a flowchart illustrating a method of controlling a walking assistance device based on a first force and a second force according to at least one example embodiment.

Referring to FIGS. 6 and 12, operation 670 of FIG. 6 may include operations 1210 and 1220.

In operation 1210, the electronic device 500 determines a gait phase of a user based on a first force and a second force. For example, the electronic device 500 may determine a gait phase of the user based on a measured angle q, a linear velocity υ, an angular velocity ω, the first force, and the second force.

In some example embodiments, the electronic device 500 may calculate the gait phase using an FSM. For example, the electronic device 500 may determine the gait phase by comparing the measured angle q, the linear velocity υ, the angular velocity ω, the first force, and the second force with parameters set for a desired (or, alternatively, a predetermined) number of gait phases.

In other example embodiments, the electronic device 500 may calculate the gait phase using a particularly shaped adaptive oscillator (PSAO). A trajectory of a desired (or, alternatively, a predetermined) parameter for the gait cycle may be defined in advance. In this example, the gait phase may be determined by determining an interval corresponding to a measured parameter in the trajectory.

In other example embodiments, the electronic device 500 may determine a gait phase of the user based on a force equivalent. The electronic device 500 may detect a characteristic of the force equivalent, so that the gait phase is determined based on the detected characteristic. The characteristic of the force equivalent may include, for example, a difference between a calculated force equivalent and a previous force equivalent and a variation of a difference occurring on a time-by-time basis.

In operation 1220, the electronic device 500 controls a joint of the walking assistance device based on the determined gait phase. For example, an angle of the joint may be controlled. A method of controlling the joint of the walking assistance device will be described in detail with reference to FIG. 13.

Figure 13:
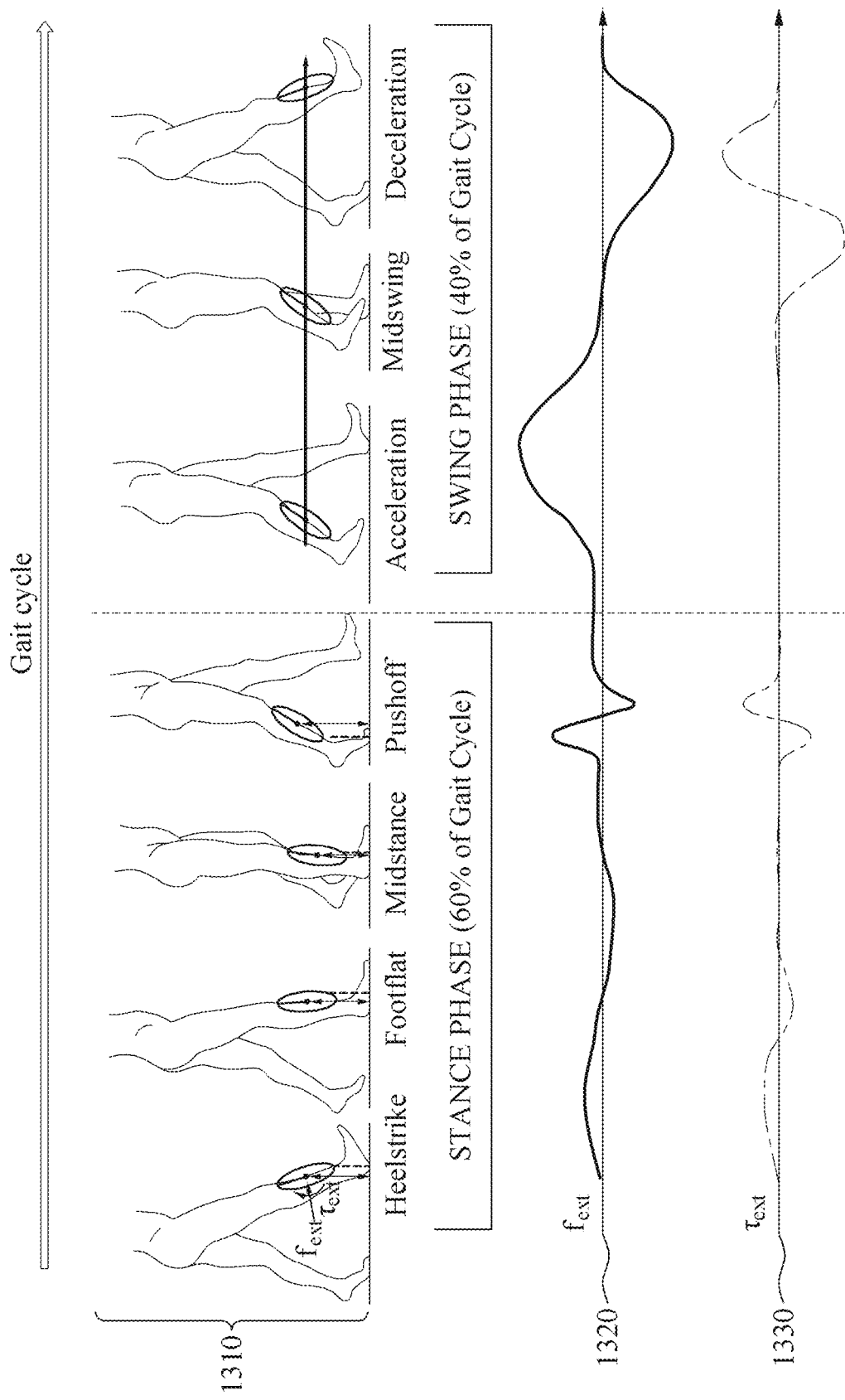
FIG. 13 illustrates a force and a torque generated in a gait cycle according to at least one example embodiment.

FIG. 13 illustrates a force and a torque generated in a gait cycle according to at least one example embodiment.

Referring to FIG. 13, FIG. 13 illustrates a motion 1310 of a right leg of a user in a gait cycle. A trajectory 1320 of a force and a trajectory 1330 of a torque (or a moment) with respect to the gait cycle may be set in advance. A force equivalent may be an expression that considers the force and the torque simultaneously.

The electronic device 500 may determine a gait phase by determining an interval corresponding to the calculated force equivalent in a force equivalent trajectory. The electronic device 500 may determine an output torque corresponding to the determined gait phase. For example, an output torque corresponding to the determined gait phase may be determined based on a torque trajectory of a desired (or, alternatively, a preset) gait cycle.

A torque trajectory may be previously set to assist a motion of a user performed in a determined (or, alternatively, a predetermined) gait phase. As an example, when the determined gait phase is a heel strike, a joint may be controlled for damping of the walking assistance apparatus. As another example, when the determined gait phase is a push-off, the joint may be controlled such that a gait acceleration occurs.

Figure 14:
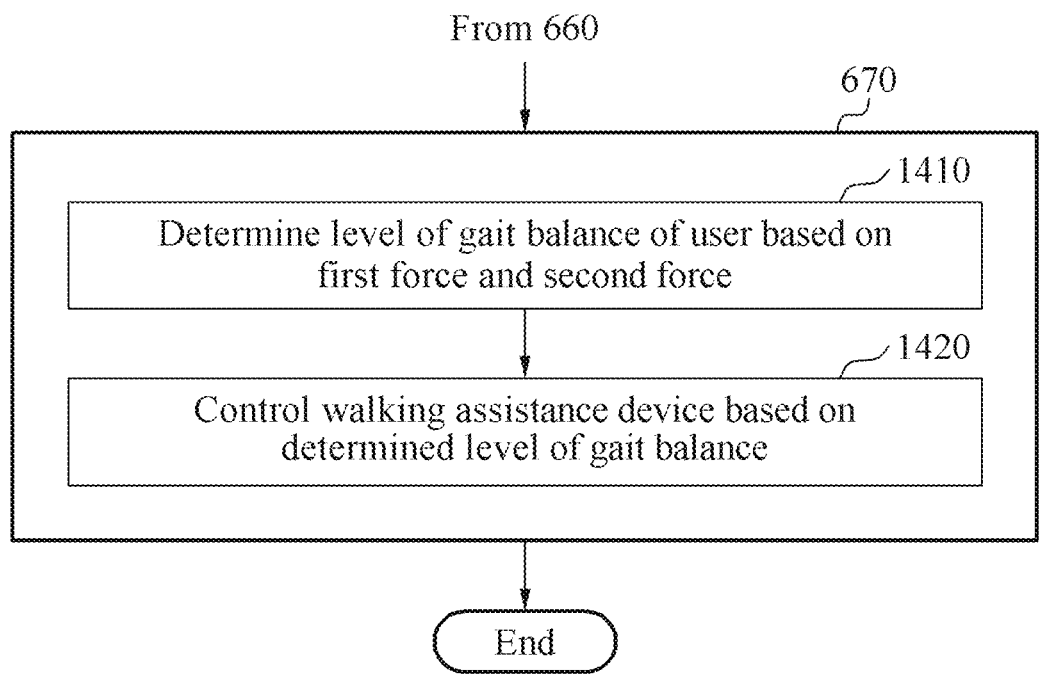
FIG. 14 is a flowchart illustrating a method of controlling a walking assistance device based on a first force and a second force according to at least one example embodiment.

FIG. 14 is a flowchart illustrating a method of controlling a walking assistance device based on a first force and a second force according to at least one example embodiment.

Referring to FIGS. 6 and 14, operation 670 of FIG. 6 may include operations 1410 and 1420.

In operation 1410, the electronic device 500 determines a level of gait balance of a user based on a first force and a second force. Since each of the first force and the second force includes a direction of the corresponding force, the electronic device 500 may determine a level of gait balance based on the direction of the force. As an example, when a force is generated in a horizontal direction based on a sole, the electronic device 500 may determine that the level of gait balance is relatively low. As another example, when a gait cycle of a left foot does not match a gait cycle of a right foot, the electronic device 500 may determine that the level of gait balance is relatively low.

In operation 1420, the electronic device 500 controls the walking assistance device based on the determined level of gait balance. As an example, the electronic device 500 may control an angle of at least one of an ankle, a knee, and a hip joint of the user such that a direction of a force applied to the walking assistance device is not dispersed. As another example, when a gait cycle of the left foot does not match a gait cycle of the right foot, a risk of falling may be high and thus, the electronic device 500 may control the walking assistance device to prevent the falling.

Figure 15:
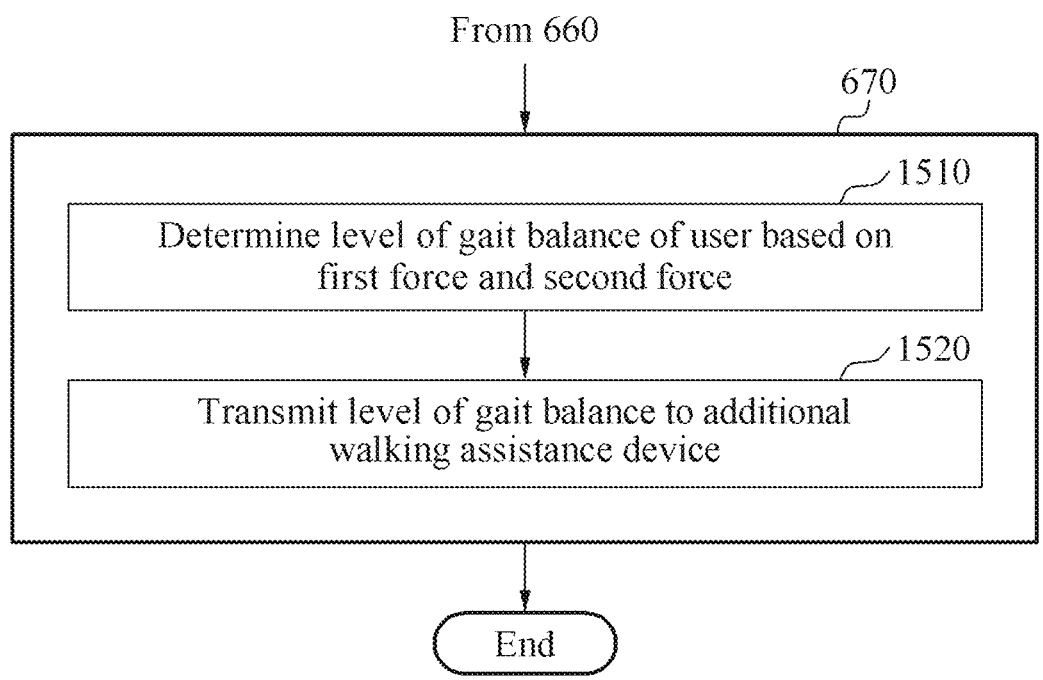
FIG. 15 is a flowchart illustrating a method of controlling a walking assistance device based on a first force and a second force according to at least one example embodiment.

FIG. 15 is a flowchart illustrating a method of controlling a walking assistance device based on a first force and a second force according to at least one example embodiment.

Referring to FIGS. 6 and 15, operation 670 of FIG. 6 includes operations 1510 and 1520. For example, when the electronic device 500 is included in an ankle-type walking assistance device, the electronic device 500 may transmit a determined level of gait balance to an additional walking assistance device.

In operation 1510, the electronic device 500 determines a level of gait balance of a user based on a first force and a second force.

In operation 1520, the electronic device 500 transmits the determined level of gait balance to an additional walking assistance device. The additional walking assistance device may be a device operating in conjunction with a walking assistance device. The additional walking assistance device may be, for example, a hip-type walking assistance device. The hip-type walking assistance device may assist walking of the user by providing an assist torque to a hip joint of the user. For example, when a gait cycle of a left leg does not match a gait cycle of a right leg, the hip-type walking assistance device may operate to reduce a degree of unmatching.

The hip-type walking assistance device will be described in detail with reference to FIGS. 16 and 17, and a body-type walking assistance device will be described in detail with reference to FIGS. 18 through 20.

Hereinafter, the hip-type walking assistance device will be described.

Figure 16:
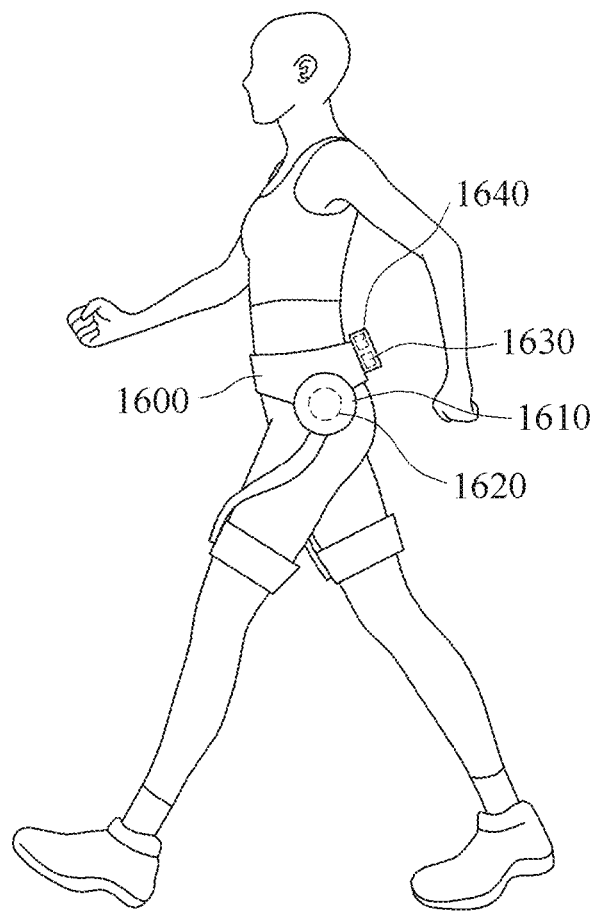
FIGS. 16 and 17 illustrate a hip-type walking assistance device according to at least one example embodiment.
Figure 17:
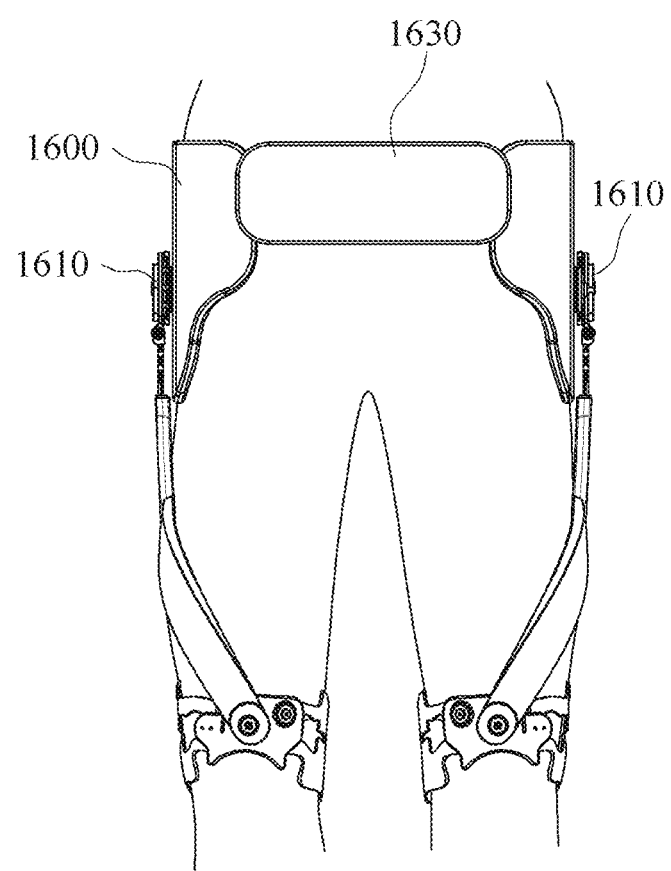

FIGS. 16 and 17 illustrate a hip-type walking assistance device according to at least one example embodiment.

Referring to FIG. 16, a hip-type walking assistance device 1600 is worn by a user and to assist walking of the user. The walking assistance device 1600 may be a wearable device. For example, the electronic device 500 may be included in the walking assistance device 1600.

The examples of FIGS. 16 and 17 may be applicable to a hip-type but are not limited thereto. The present examples may be applicable to any type of devices that assist walking of the user.

Referring to FIG. 16, the hip-type walking assistance device 1600 includes a driver 1610, a sensor 1620, an IMU 1630, and a controller 1640.

The driver 1610 may provide a driving force to a hip joint of the user. For example, the driver 1610 may be provided to a right hip portion and/or a left hip portion of the user. The driver 1610 may include a motor capable of generating a rotational torque.

The sensor 1620 may measure an angle of the hip joint of the user during walking. Information associated with the angle of the hip joint of the user sensed at the sensor 1620 may include an angle of a right hip joint, an angle of a left hip joint, a difference between the angle of the right hip joint and the angle of the left hip joint, and a hip joint motion direction. For example, the sensor 1620 may be included in the driver 1610.

The sensor 1620 may include a potentiometer. The potentiometer may sense a right (R) axis joint angle, a left (L) axis joint angle, an R axis joint acceleration, and an L axis joint acceleration according to a gait motion of the user.

The IMU 1630 may measure acceleration and posture information during walking. For example, the IMU 1630 may sense each of X axis, Y axis, and Z axis acceleration, and X axis, Y axis, and Z axis angular velocity according to a gait motion of the user.

The hip-type walking assistance device 1600 may detect a point at which a foot of the user lands based on acceleration information measured by the IMU 1630.

In addition to the sensor 1620 and the IMU 1630, the hip-type walking assistance device 1600 may include other sensors, for example, an electromyogram (EMG) sensor and an electroencephalogram (EEG) sensor capable of sensing a change in biosignals or momentum of the user according to the gait motion of the user.

The controller 1640 may control the driver 1610 to output an assistance force to assist walking of the user. For example, the hip-type walking assistance device 1600 may include two drivers 1610 on a left hip and a right hip of the user, respectively, and the controller 1640 may output control signals for controlling the two drivers 1610 to generate a torque. The controller 1640 may include a communicator, a processor, and a memory.

The driver 1610 may generate a torque in response to the control signal output from the controller 1640. The hip-type walking assistance device 1600 may include the driver 1610 for a right leg of the user and the driver 1610 for a left leg of the user. For example, the controller 1640 may be designed to control one of the drivers 1610. If the controller 1640 controls only a single driver 1610, a number of controllers 1640 may be provided. As another example, the controller 1640 may be designed to control all of the drivers 1610 for the left leg and the right leg of the user.

Hereinafter, the body-type walking assistance device will be described.

Figure 18:
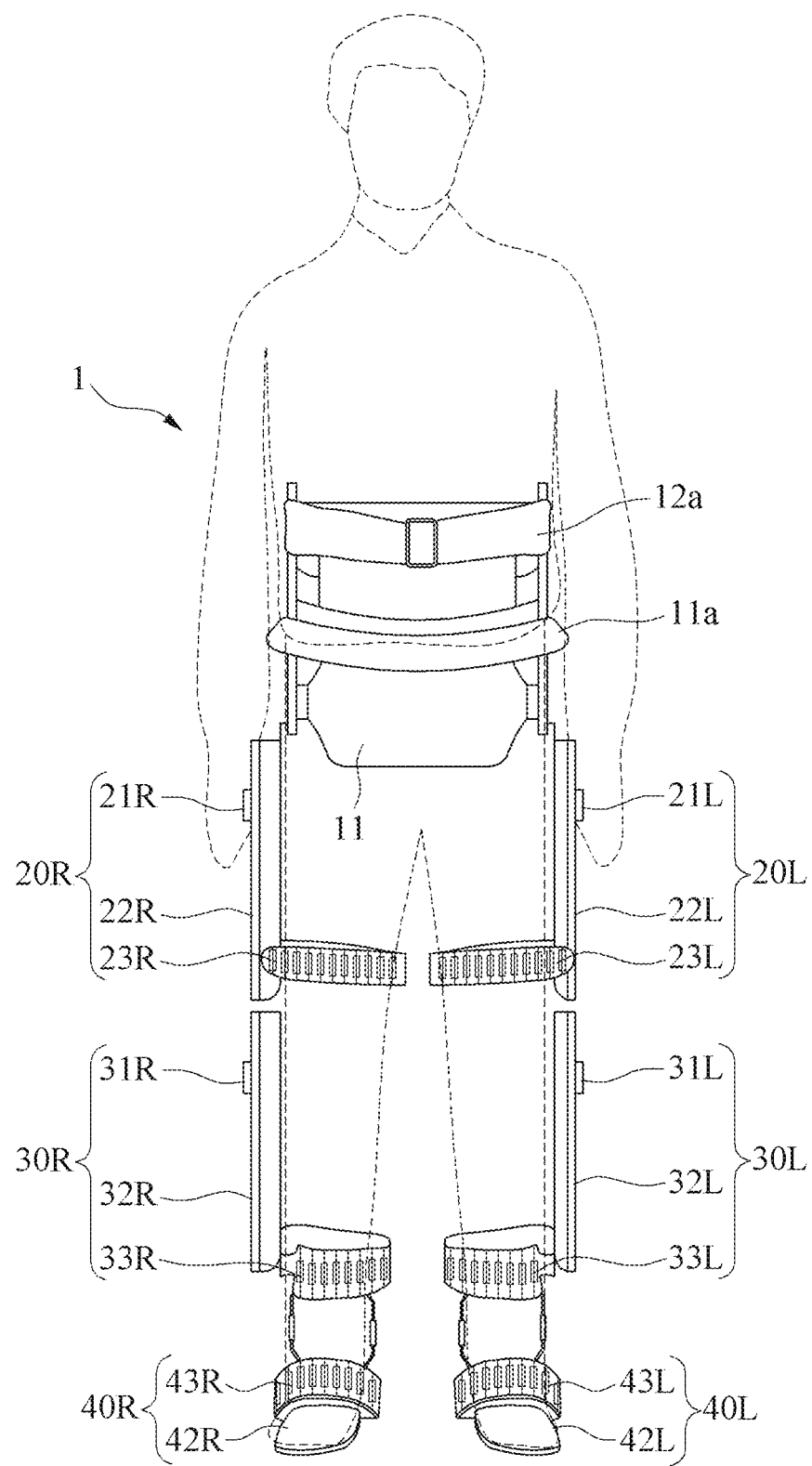
FIGS. 18 through 20 illustrate a body-type walking assistance device according to at least one example embodiment.
Figure 19:
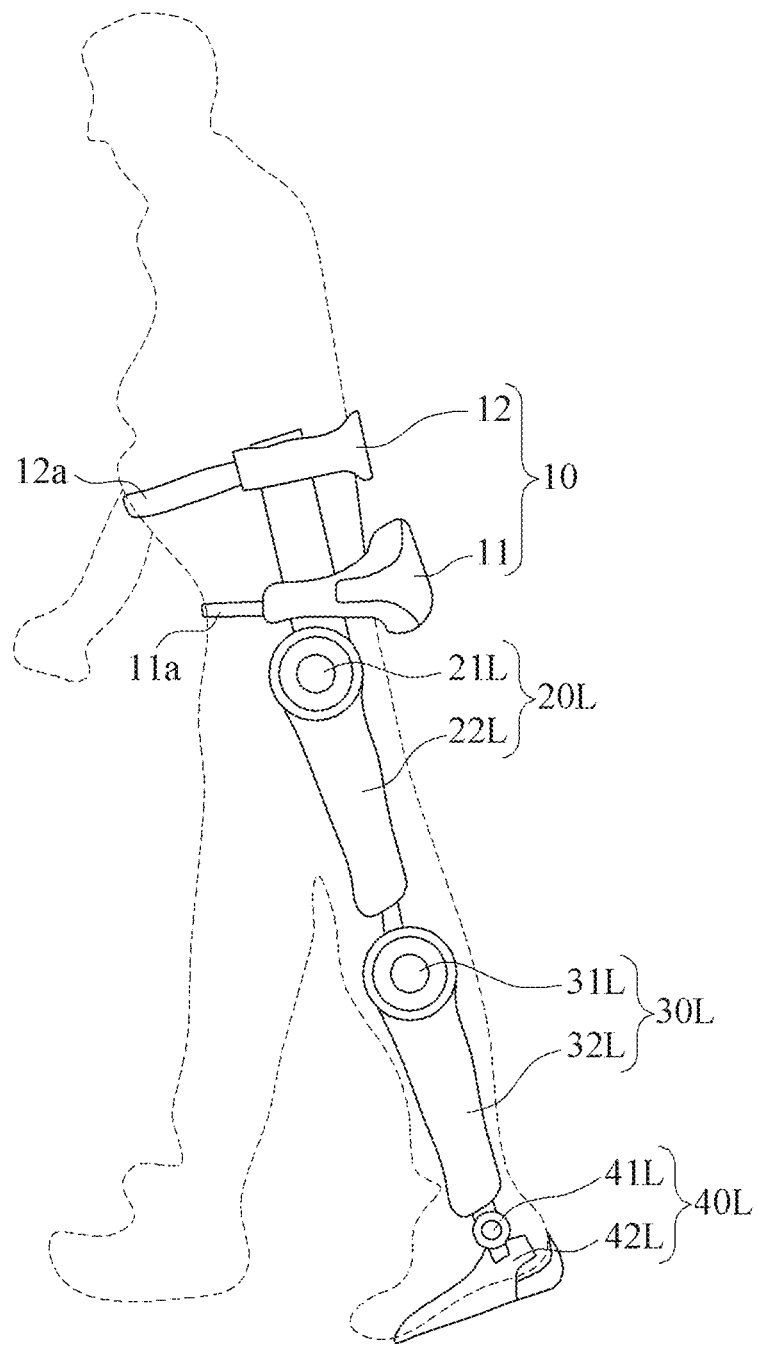
Figure 20:
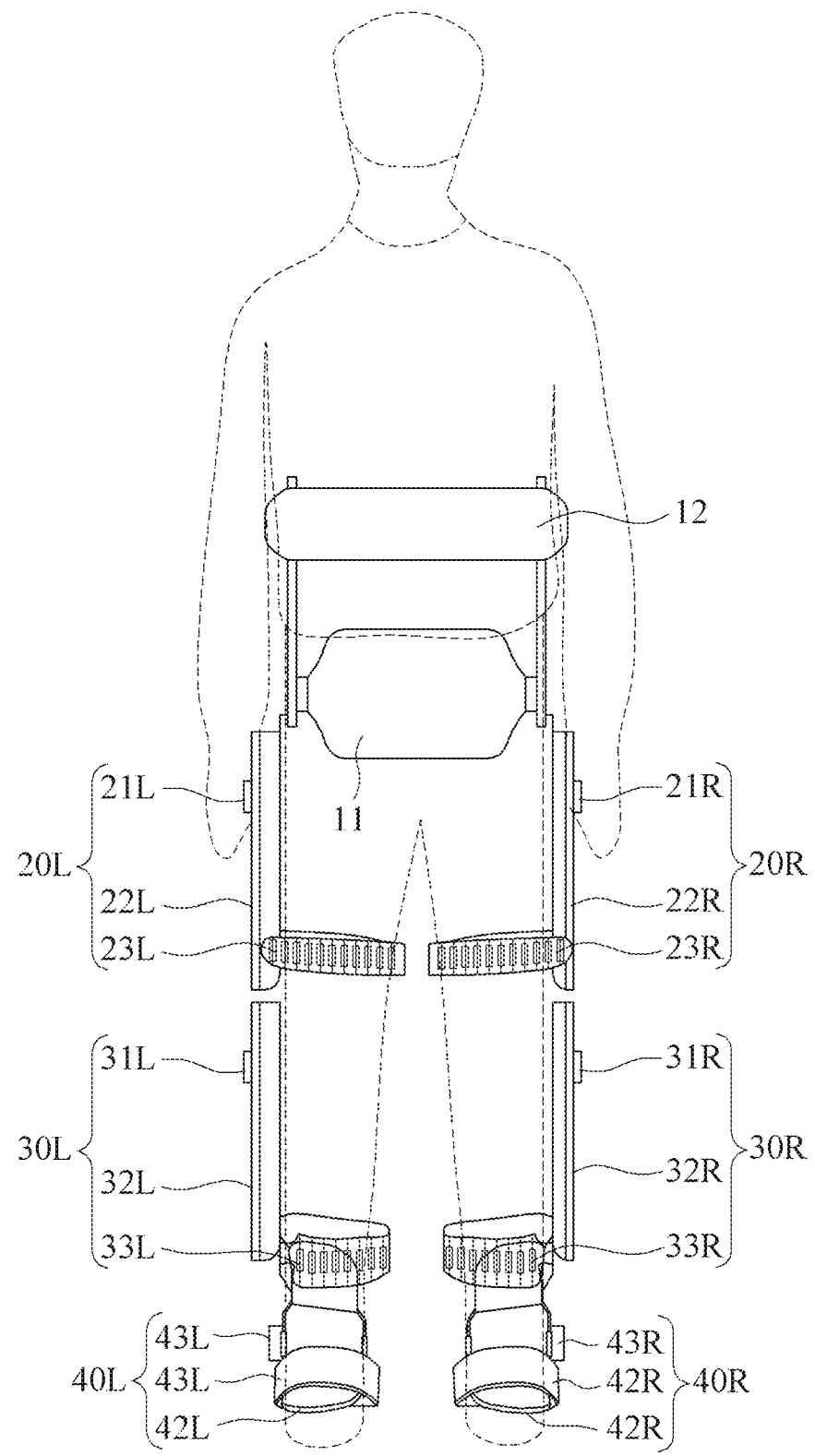

FIGS. 18 through 20 illustrate a body-type walking assistance device according to at least one example embodiment. FIG. 18 is a front view of a body-type walking assistance device 1, FIG. 17 is a side view of the body-type walking assistance device 1, and FIG. 18 is a rear view of the body-type walking assistance device 1. For example, the electronic device 500 may be included in the body-type walking assistance device 1

According to an aspect, the body-type walking assistance device 1 may include the driver 1610, the sensor 1620, the IMU 1630, and the controller 1640.

Referring to FIGS. 18 through 20, the body-type walking assistance device 1 may be in an exoskeleton structure to be wearable to each of a left leg and a right leg of a user. The user may perform a motion, for example, an extension motion, a flexion motion, an adduction motion, and an abduction motion, with wearing the body-type walking assistance device 1. The extension motion is a movement that extends a joint, and the flexion motion is a movement that flexes a joint. The adduction motion is a movement that moves a leg to be close to a central axis of the body, and the abduction motion is a movement that extends a leg to be away from the central axis of the body.

Referring to FIGS. 18 through 20, the body-type walking assistance device 1 may include a body 10 and a mechanical part, for example, first structural parts 20R and 20L, second structural parts 30R and 30L, and third structural parts 40R and 40L.

The body 10 may include a housing 11. Various parts may be embedded in the housing 11. The parts embedded in the housing 11 may include, for example, a central processing unit (CPU), a printed circuit board (PCB), various types of storage devices, and a force source. For example, the body 10 may include the controller 1640. The controller 1640 may include the CPU and the PCB.

The CPU may be a microprocessor. The microprocessor may include an arithmetic logic operator, a register, a program counter, a command decoder and/or a control circuit in a silicon chip. The CPU may generate a control mode suitable for a walking environment, and may generate a control signal for controlling an operation of a mechanical part based on the selected control mode.

The PCB refers to a board on which a predetermined circuit is printed and may include the CPU and/or various storage devices. The PCB may be fixed in the housing 11.

Various types of storage devices may be included in the housing 11. The storage devices may include a magnetic disk storage device to store data by magnetizing the surface of a magnetic disk and a semiconductor memory device to store data using various types of memory semiconductors.

The force source embedded in the housing 11 may supply force to various types of parts embedded in the housing 11 or the mechanical part, for example, the first structural parts 20R and 20L, the second structural parts 30R and 30L, and the third structural parts 40R and 40L.

The body 10 may further include a waist support 12 configured to support a waist of the user. The waist support 12 may be in a shape of a curved flat plate to support the waist of the user.

The body 10 may further include a fastener 11a configured to fasten the housing 11 to a hip portion of the user and a fastener 12a configured to fasten the waist support 12 to the waist of the user. The fastener 11a, 12a may be configured as one of a band, a belt, and a strap having elasticity.

The body 10 may include the IMU 1630. For example, the IMU 1630 may be provided outside or inside the housing 11. The IMU 1630 may be installed on the PCB embedded in the housing 11. The IMU 1630 may measure an acceleration and an angular velocity.

As illustrated in FIGS. 18 through 20, the mechanical part may include the first structural part 20R, 20L, the second structural part 30R, 30L, and the third structural part 40R, 40L.

The first structural part 20R, 20L may assist a motion of a femoral region and a hip joint of the user during a gait operation. The first structural parts 20R and 20L may include first drivers 21R and 21L, first supports 22R and 22L, and first fasteners 23R and 23L, respectively.

The driver 1610 may include the first driver 21R, 21L. The description related to the driver 1610 made with reference to FIGS. 16 and 17 may be applied to the first driver 21R, 21L.

The first driver 21R, 21L may be provided at a location of a corresponding hip joint of the first structural part 20R, 20L, and may generate a rotational force in a predetermined direction at various magnitudes. The rotational force generated by the first driver 21R, 21L may be applied to the first support 22R, 22L. The first driver 21R, 21L may be set to rotate within the movement range of a hip joint of the human body.

The first driver 21R, 21L may be driven in response to a control signal provided from the body 10. Although the first driver 21R, 21L may be configured as one of a motor, a vacuum pump, and a hydraulic pump, it is provided as an example only.

A joint angle sensor may be installed around the first driver 21R, 21L. The joint angle sensor may detect an angle at which the first driver 21R, 21L rotates based on a rotational axis. The sensor 1620 may include the joint angle sensor.

The first support 22R, 22L may be physically connected to the first driver 21R, 21L. The first support 22R, 22L may rotate in a predetermined direction based on the rotational force generated by the first driver 21R, 21L.

The first support 22R, 22L may be provided in various shapes. For example, the first support 22R, 22L may be in a shape in which a plurality of knuckles is inter-connected. Here, a joint may be provided between the knuckles. The first support 22R, 22L may bend within a predetermined range by the joint. As another example, the first support 22R, 22L may be provided in a bar shape. Here, the first support 22R, 22L may be configured using a flexible material to be bendable within a predetermined range.

The first fastener 23R, 23L may be provided to the first support 22R, 22L. The first fastener 23R, 23L serves to fasten the first support 22R, 22L to a corresponding femoral region of the user.

FIGS. 18 through 20 illustrate an example in which the first supports 22R and 22L are fastened to the outside of the femoral regions of the user by the first fasteners 23R and 23L, respectively. When the first support 22R, 22L rotates in response to the first driver 21R, 21L being driven, the femoral region to which the first support 22R, 22L is fastened may rotate in the same direction in which the first support 22R, 22L rotates.

The first fastener 23R, 23L may be configured as one of a band, a belt, and a strap having elasticity, or may be configured using a metal material. FIG. 16 illustrates an example in which the first fastener 23R, 23L is configured using a chain.

The second structural part 30R, 30L may assist a motion of a lower leg and a knee joint of the user during a gait operation. The second structural parts 30R and 30L include second drivers 31R and 31L, second supports 32R and 32L, and second fasteners 33R and 33L, respectively.

The second driver 31R, 31L may be provided at a location of a corresponding knee joint of the second structural part 30R, 30L, and may generate a rotational force in a predetermined direction at various magnitudes. The rotational force generated by the second driver 31R, 31L may be applied to the second support 22R, 22L. The second driver 31R, 31L may be set to rotate within a movement range of a knee joint of the human body.

The driver 1610 may include the second driver 31R, 31L. The description related to the hip joint made with reference to FIGS. 16 and 17 may be similarly applied to the knee joint.

The second driver 31R, 31L may be driven in response to a control signal provided from the body 10. Although the second driver 31R, 31L may be configured as one of a motor, a vacuum pump and a hydraulic pump, it is provided as an example only.

A joint angle sensor may be installed around the second driver 31R, 31L. The joint angle sensor may detect an angle at which the second driver 31R, 31L rotates based on a rotational axis. The sensor 1620 may include the joint angle sensor.

The second support 32R, 32L may be physically connected to the second driver 31R, 31L. The second support 32R, 32L may rotate in a predetermined direction based on the rotational force generated by the second driver 31R, 31L.

The second fastener 33R, 33L may be provided to the second support 32R, 32L. The second fastener 33R, 33L serves to fasten the second support 32R, 32L to a lower leg portion of the user. FIGS. 18 through 20 illustrate an example in which the second supports 32R and 32L are fastened at the outside of lower leg portions of the user by the second fasteners 33R and 33L, respectively. If the second support 33R, 33L rotates in response to driving of the second driver 31R, 31L, the lower leg portion to which the second support 33R, 33L is fastened may rotate in the same direction in which the second support 33R, 33L rotates.

The second fastener 33R, 33L may be configured as one of a band, a belt, and a strap having elasticity, or may be configured using a metal material.

The third structural part 40R, 40L may assist a motion of an ankle joint and related muscles of the user during a gait operation. The third structural parts 40R and 40L may include third drivers 41R and 41L, foot supports 42R and 42L, and third fasteners 43R and 43L, respectively.

The driver 1610 may include the third driver 41R, 41L. The description related to the hip joint made with reference to FIGS. 16 and 17 may be similarly applied to the ankle joint.

The third driver 41R, 41L may be provided to a corresponding ankle joint of the third structural part 40R, 40L, and may be driven in response to a control signal provided from the body 10. Similar to the first driver 21R, 21L or the second driver 31R, 31L, the third driver 41R, 41L may be configured as a motor.

A joint angle sensor may be installed around the third driver 41R, 41L. The joint angle sensor may detect an angle at which the third driver 41R, 41L rotates based on a rotational axis. The sensor 1620 may include the joint angle sensor.

The foot support 42R, 42L may be provided at a location corresponding to a sole of the user, and may be physically connected to the third driver 41R and 41L.

A pressure sensor configured to detect a weight of the user may be provided to the foot support 42R, 42L. A detection result of the pressure sensor may be used to determine whether the user is wearing the body-type walking assistance device 1, whether the user stands, whether a foot of the user is in contact with the ground, and the like.

The third fastener 43R, 43L may be provided to the foot support 42R, 42L. The third fastener 43R, 43L serves to fasten a foot of the user to the foot support 42R, 42L.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

A number of example embodiments have been described above. Nevertheless, it should be understood that various modifications may be made to these example embodiments.

For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of controlling a walking assistance device, the walking assistance device including a first frame, a second frame, and a joint connecting the first frame and the second frame, the method comprising:
    measuring an angle of the joint of the walking assistance device based on angle information received from an angle sensor associated with the joint;
    calculating an angular velocity and a linear velocity of the first frame based on inertial information received from an inertial measurement unit (IMU) associated with the first frame;
    updating a dynamics model to generate an updated dynamics model for the walking assistance device based on the angle, the angular velocity, and the linear velocity;
    calculating a force equivalent and a torque equivalent applied to the walking assistance device based on the updated dynamics model;
    determining a gait phase of a user wearing the walking assistance device by,
        determining a first force applied to the first frame and a second force applied to the second frame based on the force equivalent and the torque equivalent, and
        determining the gait phase based on at least the force equivalent calculated using a disturbance observer by analyzing the first force and the second force without utilizing force sensors to measure a ground reaction force (GRF); and
    controlling the walking assistance device based on the gait phase.

2. The method of claim 1, wherein the updating of the dynamics model comprises:
    calculating an inertia matrix in the dynamics model based on at least one of the angle, the angular velocity, and the linear velocity;
    calculating a Coriolis matrix in the dynamics model based on at least one of the angle, the angular velocity, and the linear velocity; and
    setting the inertia matrix and the Coriolis matrix in the dynamics model to generate the updated dynamics model.

3. The method of claim 1, wherein the calculating of the force equivalent and the torque equivalent comprises:
    calculating the force equivalent and the torque equivalent by filtering the updated dynamics model using a low-pass filter.

4. The method of claim 1, wherein the calculating of the first force and the second force comprises:
    calculating the first force and the second force using a torque acting on the joint, the force equivalent, and the torque equivalent.

5. The method of claim 1, wherein the controlling the angle of the joint comprises:
    controlling the joint to dampen the walking assistance device when the gait phase is a heel strike.

6. The method of claim 1, wherein the controlling the angle of the joint comprises:
    controlling the joint such that a gait acceleration occurs when the gait phase is a push-off.

7. The method of claim 1, wherein the controlling of the walking assistance device comprises:
    determining a level of gait balance of a user wearing the walking assistance device based on the first force and the second force; and
    controlling the walking assistance device based on the level of gait balance.

8. The method of claim 1, wherein the controlling of the walking assistance device comprises:
    determining a level of gait balance of a user of the walking assistance device based on the first force and the second force; and
    transmitting the level of gait balance to an additional walking assistance device, wherein
        a gait balance of the user is controlled by the additional walking assistance device.

9. The method of claim 1, wherein the first frame is attached to a calf of a user and the joint of the walking assistance device is configured to control an ankle joint of the user.

10. A non-transitory computer-readable medium comprising computer readable instructions to cause a computer to perform the method of claim 1.

11. An electronic device configured to control a walking assistance device, the walking assistance device including a first frame, a second frame, and a joint connecting the first frame and the second frame, the electronic device comprising:
    a memory configured to store a program associated with controlling the walking assistance device; and
    a processor configured to execute the program to,
        measure an angle of the joint of the walking assistance device based on angle information received from an angle sensor associated with the joint,
        calculate an angular velocity and a linear velocity of the first frame based on inertial information received from an inertial measurement unit (IMU) associated with the first frame,
        update a dynamics model for the walking assistance device to generate an updated dynamics model based on the angle, the angular velocity, and the linear velocity,
        calculate a force equivalent and a torque equivalent applied to the walking assistance device based on the updated dynamics model,
        determine a gait phase of a user wearing the walking assistance device by,
            determining a first force applied to the first frame and a second force applied to the second frame based on the force equivalent and the torque equivalent, and
            determining the gait phase based on at least the force equivalent calculated using a disturbance observer by analyzing the first force and the second force without utilizing force sensors to measure a ground reaction force (GRF), and
        control the walking assistance device based on the gait phase.

12. The electronic device of claim 11, wherein the processor is configured to update the dynamics model by,
    calculating an inertia matrix in the dynamics model based on at least one of the angle, the angular velocity, and the linear velocity;
    calculating a Coriolis matrix in the dynamics model based on at least one of the angle, the angular velocity, and the linear velocity; and setting the inertia matrix and the Coriolis matrix in the dynamics model to generate the updated dynamics model.

13. The electronic device of claim 11, wherein the processor is configured to determine the first force and the second force by,
    calculating a force equivalent and a torque equivalent applied to the walking assistance device based on the updated dynamics model; and
    calculating the first force and the second force based on the force equivalent and the torque equivalent.

14. The electronic device of claim 13, wherein the processor is configured to calculate the force equivalent and the torque equivalent by,
    converting the updated dynamics model into a disturbance observer (DOB) model; and
    calculating the force equivalent and the torque equivalent based on the DOB model.

15. The electronic device of claim 11, wherein the processor is configured to control the walking assistance device by,
    determining a gait phase of a user wearing the walking assistance device based on the first force and the second force; and
    controlling the angle of the joint of the walking assistance device based on the gait phase.

16. A method of controlling a walking assistance device, the walking assistance device including a first frame, a second frame, and a joint connecting the first frame and the second frame, the method comprising:
    measuring an angle of the joint of the walking assistance device based on angle information received from an angle sensor associated with the joint;
    calculating an angular velocity and a linear velocity of the first frame based on inertial information acquired from an inertial measurement unit (IMU) associated with the first frame;
    updating a dynamics model for the walking assistance device to generate an updated dynamics model based on the angle, the angular velocity, and the linear velocity;
    determining a force equivalent applied to the walking assistance device based on the updated dynamics model;
    determining a gait phase based on the force equivalent by,
        determining a first force applied to the first frame and a second force applied to the second frame based on at least the force equivalent, and
        determining the gait phase based on at least the force equivalent calculated using a disturbance observer by analyzing the first force and the second force without utilizing force sensors to measure a ground reaction force (GRF); and
    controlling the walking assistance device based on the gait phase.

17. The method of claim 16, wherein the determining of the gait phase comprises:
    detecting a characteristic of the force equivalent; and
    determining the gait phase based on the characteristic.

18. The method of claim 16, wherein the controlling of the walking assistance device comprises:
    determining an output torque corresponding to the gait phase; and
    controlling the walking assistance device such that the output torque is output by the walking assistance device.

* * * * *